US010890520B2

(12) United States Patent
Goda et al.

(10) Patent No.: US 10,890,520 B2
(45) Date of Patent: Jan. 12, 2021

(54) FLOW CYTOMETER

(71) Applicant: THE UNIVERSITY OF TOKYO, Tokyo (JP)

(72) Inventors: Keisuke Goda, Tokyo (JP); Yasuyuki Ozeki, Tokyo (JP); Hideharu Mikami, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 36 days.

(21) Appl. No.: 16/330,748

(22) PCT Filed: Sep. 5, 2017

(86) PCT No.: PCT/JP2017/031937
§ 371 (c)(1),
(2) Date: Mar. 5, 2019

(87) PCT Pub. No.: WO2018/047815
PCT Pub. Date: Mar. 15, 2018

(65) Prior Publication Data
US 2019/0226976 A1 Jul. 25, 2019

(30) Foreign Application Priority Data
Sep. 6, 2016 (JP) .................................. 2016-173377

(51) Int. Cl.
*G01N 15/14* (2006.01)
*G01N 21/17* (2006.01)
(Continued)

(52) U.S. Cl.
CPC ......... *G01N 15/1459* (2013.01); *G01N 15/14* (2013.01); *G01N 15/1463* (2013.01);
(Continued)

(58) Field of Classification Search
CPC ............... G01N 15/14; G01N 15/1459; G01N 15/1463; G01N 21/17; G02B 21/36; G03B 15/00; G03B 7/091
(Continued)

(56) References Cited

U.S. PATENT DOCUMENTS 2,885,923 A * 5/1959 Simmons ................ G01N 21/43
356/136
5,256,886 A * 10/1993 Wolf ....................... G01N 21/53
250/228
(Continued)

FOREIGN PATENT DOCUMENTS

JP H01-276883 A 11/1989
JP H06-186156 A 7/1994
(Continued)

OTHER PUBLICATIONS

Kay et al., "Imaging in Flow," The Journal of Histochemistry and Cytochemistry, 1979, vol. 27, No. 1, pp. 329-334.
(Continued)

*Primary Examiner* — Tri T Ton
(74) *Attorney, Agent, or Firm* — Oliff PLC

(57) ABSTRACT

A flow cytometer including a flow cell in which an imaging object flows; a laser beam irradiator configured to radiate laser beam; a camera including an image sensor of N×M pixels; and an optical system configured to introduce the laser beam from the laser beam irradiator to imaging range of flow cell and to introduce signal light, such as transmitted, reflected or scattered light, from imaging range of flow cell, to camera. Optical system includes a mirror device that is placed on a Fourier plane of imaging optical system, that has at least one mirror specularly reflecting the signal light, and that is driven and rotated in conjunction with a flow in flow cell, such that each part of an image formed by the signal light is introduced into an identical pixel of the image sensor
(Continued)

for at least a predetermined time period from a predetermined timing.

11 Claims, 16 Drawing Sheets

(51) Int. Cl.
    *G02B 21/36*     (2006.01)
    *G03B 15/00*     (2006.01)
    *G03B 7/091*     (2006.01)

(52) U.S. Cl.
    CPC ............. *G01N 21/17* (2013.01); *G02B 21/36* (2013.01); *G03B 7/091* (2013.01); *G03B 15/00* (2013.01)

(58) Field of Classification Search
    USPC .................................. 356/432–448, 213–236
    See application file for complete search history.

(56) References Cited

U.S. PATENT DOCUMENTS

| | | |
|---|---|---|
| 5,426,499 A | 6/1995 | Kosaka et al. |
| 6,061,154 A | 5/2000 | Campbell et al. |
| 2006/0072191 A1 * | 4/2006 | Akiyama ............ G02B 21/0032 359/385 |
| 2013/0132405 A1 | 5/2013 | Bestgen et al. |
| 2015/0350573 A1 | 12/2015 | Toda et al. |
| 2016/0261798 A1 | 9/2016 | Ishikawa et al. |

FOREIGN PATENT DOCUMENTS

| | | |
|---|---|---|
| JP | H06-210037 A | 8/1994 |
| JP | H07-199383 A | 8/1995 |
| JP | H11-095133 A | 4/1999 |
| JP | 2014-150412 A | 8/2014 |
| JP | 2015-082710 A | 4/2015 |
| WO | 2012/115979 A1 | 8/2012 |

OTHER PUBLICATIONS

Watanabe et al., "Distinct Modulated Pupil Function System for Real-Time Imaging of Living Cells," PLOS One, Sep. 2012, vol. 7, No. 9, e44028, pp. 1-13.

Nov. 28, 2017 International Search Report issued in International Patent Application No. PCT/JP2017/031937.

* cited by examiner (a) (b)

INTRACELLULAR DENSITY OF BODIPY FLUORESCENCE

FLOW CYTOMETER

TECHNICAL FIELD

The present disclosure relates to a flow cytometer.

BACKGROUND

One proposed configuration of a flow cytometer provides a mirror portion placed between an imaging object and a camera to successively change the angle of a mirror main body and thereby change the direction of visual line of the camera and serves to successively change the angle of the mirror during imaging (as described in, for example, Patent Literature 1). This technique changes the angle of the mirror main body such that the imaging object is always located in the direction of visual line of the camera. This enables less-blurred images to be continuously obtained even in an environment of movement of the camera.

Another proposed configuration places a mirror between a camera and an imaging object flowing in a flow cell and scans the flow of the imaging object with the mirror, so as to take a non-blurred image of the imaging object (as described in, for example, Non-Patent Literature 1).

CITATION LIST

Patent Literature

PTL 1: JP 2015-082710A

Non-Patent Literature

NPTL 1: D. B. Kay, et al., Journal of Histochemistry & Cytochemistry 27, 329 (1979)

SUMMARY

A recent demand for the flow cytometer is to take images of a larger number of imaging objects in a shorter time period for the purpose of the shorter-time analysis. This increases the flow rate in the flow cell and shortens the exposure time. This causes a difficulty in obtaining clear images. The above proposed configurations extend the exposure time by mirror scanning. Signal lights, such as reflected light, transmitted light and scattered light, are, however, not parallel lights. These proposed configuration accordingly only little extensions of the exposure time and obtain blurred images in an attempt to provide a sufficient exposure time.

A main object of the flow cytometer of the present disclosure is to extend an exposure time and obtain a clearer image.

The flow cytometer of the present disclosure is implemented by the following aspects, in order to achieve the main object described above.

The present disclosure is directed to a flow cytometer. The flow cytometer includes a flow cell in which an imaging object flows, a laser beam irradiator configured to radiate laser beam, a camera including an image sensor of N×M pixels, and an optical system configured to introduce the laser beam from the laser beam irradiator to an imaging range of the flow cell and to introduce signal light, such as transmitted light, reflected light or scattered light, from the imaging range of the flow cell, to the camera. The optical system includes a mirror device that is placed on a Fourier plane of an imaging optical system, that has at least one mirror specularly reflecting the signal light, and that is driven and rotated in conjunction with a flow in the flow cell, such that each part of an image formed by the signal light is introduced into an identical pixel of the image sensor for at least a predetermined time period from a predetermined timing.

In the flow cytometer of this aspect, the optical system introduces the laser beam from the laser beam irradiator to the imaging range in the flow cell, while introducing the signal light such as transmitted light, reflected light or scattered light from the imaging range in the flow cell, to the camera including the image sensor of N×M pixels. In the optical system, the mirror device that has at least one mirror specularly reflecting the signal light and that is driven and rotated in conjunction with the flow in the flow cell, such that each part of the image formed by the signal light is introduced into the identical pixel of the image sensor for at least the predetermined time period from the predetermined timing is placed on the Fourier plane of the imaging optical system. The "Fourier plane" herein means a surface that converts light of each wavelength to parallel lights by the function of Fourier transform in the vicinity of a focal point by an imaging lens. When the mirror device is placed in a location other than the Fourier plane, an image of the signal light formed by scanning of the mirror device causes out-of-focus and provides a blurred image on a sensor surface. It is accordingly difficult to continuously obtain non-blurred clear images in a wide scanning range of the mirror device. When the mirror device is placed on the Fourier plane, on the other hand, an image of the signal light can be constantly formed on the image sensor even in the case of scanning of the mirror device. This configuration results in increasing a scanning angle range and thereby extends a time period when each part of the image formed by the signal light is introduced into the identical pixel of the image sensor (exposure time). Because of this reason, the mirror device is placed on the Fourier plane in the flow cytometer of the present disclosure. As a result, the flow cytometer of this aspect extends the exposure time and obtains a clearer image. In the flow cytometer of the present disclosure, cells are expected as an observation object. The observation object is, however, not limited to cells but may be general particles including inorganic substances.

The flow cytometer according to this aspect of the present disclosure may further include a predetermined timing setting device configured to set the predetermined timing, a camera control device configured to control the camera, such as to open a shutter for a time period that is equal to or longer than the predetermined time period in connection with the predetermined timing set by the predetermined timing setting device and subsequently transfer data of the image sensor to a storage device, and a laser beam irradiation control device configured to control the laser beam irradiator, such as to radiate the laser beam for the predetermined time period in connection with the predetermined timing set by the predetermined timing setting device. This configuration extends the exposure time and provides a clearer image by highly accurate synchronous control and enables imaged data to be stored in the storage device. The technique employable to set the predetermined timing may be, for example, a first setting technique of setting the predetermined timing based on a rotational position of the mirror of the mirror device, a second setting technique of setting the predetermined timing based on an operating state of the camera, or a third setting technique of setting the predetermined timing based on a predetermined cycle. In the case of the second setting technique, the camera control device may also serve as the predetermined timing setting device.

In the flow cytometer of the above aspect including the predetermined timing setting device, the camera control device and the laser beam irradiation control device, the camera may be operated in a rolling shutter mode, and the laser beam irradiator may include a laser beam adjuster configured to radiate one or two laser beams in a scanning manner from a position on the flow cell where an image is obtained with regard to a line having an earlier timing of exposure of the camera toward a position on the flow cell where an image is obtained with regard to a line having a later timing of exposure. Even in the absence of the state that all the pixels of the image sensor of the camera are exposed, this configuration allows for exposure over the entire range for the predetermined time period and enables images of cells to be reliably obtained in an image frame. This results in increasing the frame rate of the camera and enables the imaging object to be flowed in the flow cell at a higher speed and to be imaged.

In the flow cytometer of the above aspect including the predetermined timing setting device, the camera control device and the laser beam irradiation control device, the camera may be operated in a rolling shutter mode, and the flow cytometer may further include an image processing device configured to form an image of the imaging object by image processing based on data of consecutive frames of the camera stored in the storage device and a radiation timing of the laser beam from the laser beam irradiator. This configuration enables an image taken across two consecutive frames to be obtained as an image of one frame. This enables the imaging object to be flowed in the flow cell at a higher speed and to be imaged.

In the flow cytometer according to this aspect of the present disclosure, the mirror device may have mirrors that are formed on respective side faces of a regular polygonal prism and may be rotated about a center axis of the regular polygonal prism as a rotating axis. In this case, number of angles in the regular polygonal prism of the mirror device may be adjusted according to a flow rate of the flow cell, such that a required time period from a time when an angle of one side face is a predetermined angle to a time when an angle of a next side face becomes equal to the predetermined angle by rotation becomes equal to or shorter than a time period required for flow of the imaging object by a distance of the imaging range by the flow in the flow cell. This configuration enables the imaging object flowing in the flow cell to be imaged continuously.

In the flow cytometer according to this aspect of the present disclosure, the mirror device may be a resonant galvanometric scanner that vibrates in a rotating direction at a predetermined cycle. The flow cytometer may further include a camera control device configured to control the camera, such as to open a shutter for a time period equal to or longer than the predetermined time period, based on a periodical timing according to the cycle of vibration of the mirror device and subsequently transfer data of the image sensor to a storage device, and a laser beam irradiation control device configured to control the laser beam irradiator, such as to radiate the laser beam for the predetermined time period, based on the periodical timing. This configuration allows for more accurate imaging and enables imaged data to be stored in the storage device.

The flow cytometer according to this aspect of the present disclosure may further include a speed timing measurement device placed on an upstream side of the imaging range in the flow cell and configured to measure a flow rate of an imaging object flowing in the flow cell and to measure an arrival timing when center of the imaging object subjected to measurement of the flow rate reaches center of the imaging range, a mirror device control device configured to cause a center image of the imaging range to be input into a center pixel of the image sensor at the arrival timing and to drive and rotate the mirror device at a rotation speed based on the flow rate of the imaging object, a camera control device configured to control the camera, such as to open a shutter from a timing prior to the arrival timing by a time period that is longer than half the predetermined time period to a timing subsequent to the arrival timing by a time period that is longer than half the predetermined time period and subsequently transfer data of the image sensor to a storage device, and a laser beam irradiation control device configured to control the laser beam irradiator, such as to radiate the laser beam for the predetermined time period such that the arrival timing is middle of a radiation time of the laser beam. This configuration enables the imaging object to be imaged more clearly.

The flow cytometer according to this aspect of the present disclosure may further include an imaging object detector placed on an upstream side of the imaging range in the flow cell and configured to detect an imaging object flowing in the flow cell. The laser beam irradiator may include an adjuster configured to irradiate only the detected imaging object with the laser beam. This configuration enables only the imaging object to be irradiated with laser beam and to be imaged.

In the flow cytometer according to this aspect, the laser beam irradiator may be configured by scanning the imaging range with focused laser beam formed by focusing the laser beam. The flow cytometer may further include a predetermined timing setting device configured to set the predetermined timing, a camera control device configured to control the camera, such as to open a shutter for a time period that is equal to or longer than the predetermined time period in connection with the predetermined timing set by the predetermined timing setting device and subsequently transfer data of the image sensor to a storage device, and a laser beam irradiation control device configured to control the laser beam irradiator, such as to scan the imaging range with the focused laser beam during opening of the shutter of the camera. This configuration uses the focused laser beam to provide a sufficient image luminance in a shorter exposure time and accordingly provides a clearer image even in the case of incomplete descanning. In this case, the laser beam irradiation control device may control the laser beam irradiator to scan the imaging range with the focused laser beam in an opposite direction to the flow in the flow cell. This configuration reduces the effect of distortion or aberration occurring in the vicinity of the imaging range (field of view of the camera) and provides the longer descanning time.

In the flow cytometer according to this aspect, the optical system may include a multicolor mirror device that includes one mirror and at least one dichroic mirror having a different angle from an angle of the mirror or may include at least two dichroic mirrors having different angles and that is configured to reflect the signal light from the mirror device and introduce the reflected signal light to the camera. When the multicolor mirror device includes one mirror and at least one dichroic mirror, this configuration causes an exposure position (pixel) on the image sensor, of an image of a wavelength reflected by the dichroic mirror in the imaging object to be a different position from an exposure position (pixel) on the image sensor, of an image of a wavelength reflected by the mirror. More specifically, a number N of images having different wavelengths can be exposed at different exposure positions on the image sensor by using a number (N−1) of dichroic mirrors having different angles between the mirror and the wavelength to be reflected. When the multicolor mirror device includes at least two dichroic mirrors, this configuration causes exposure positions (pixels) on the image sensor, of images of wavelengths reflected by the respective dichroic mirrors in the imaging object to be different positions from one another. More specifically, a number N of images having different wavelengths can be exposed at different exposure positions on the image sensor by using a number N of dichroic mirrors having different angles from one another. In these cases, an angle of the multicolor mirror device may be adjusted such that an image reflected by the dichroic mirror and exposed on the image sensor is exposed at a position different in a flow direction or at a different position in a direction perpendicular to the flow direction from an exposed position of another image reflected by the mirror or another dichroic mirror and exposed on the image sensor.

BRIEF DESCRIPTION OF DRAWINGS

FIG. 2 is a diagram showing time changes of detection of laser beam by a laser beam detector 74, laser radiation from a laser radiation device 30, opening/closing of a shutter 64 of a camera 60 and the like;

DESCRIPTION OF EMBODIMENTS

The following describes some aspects of the present disclosure with reference to embodiments.

Embodiment 1

Figure 1:
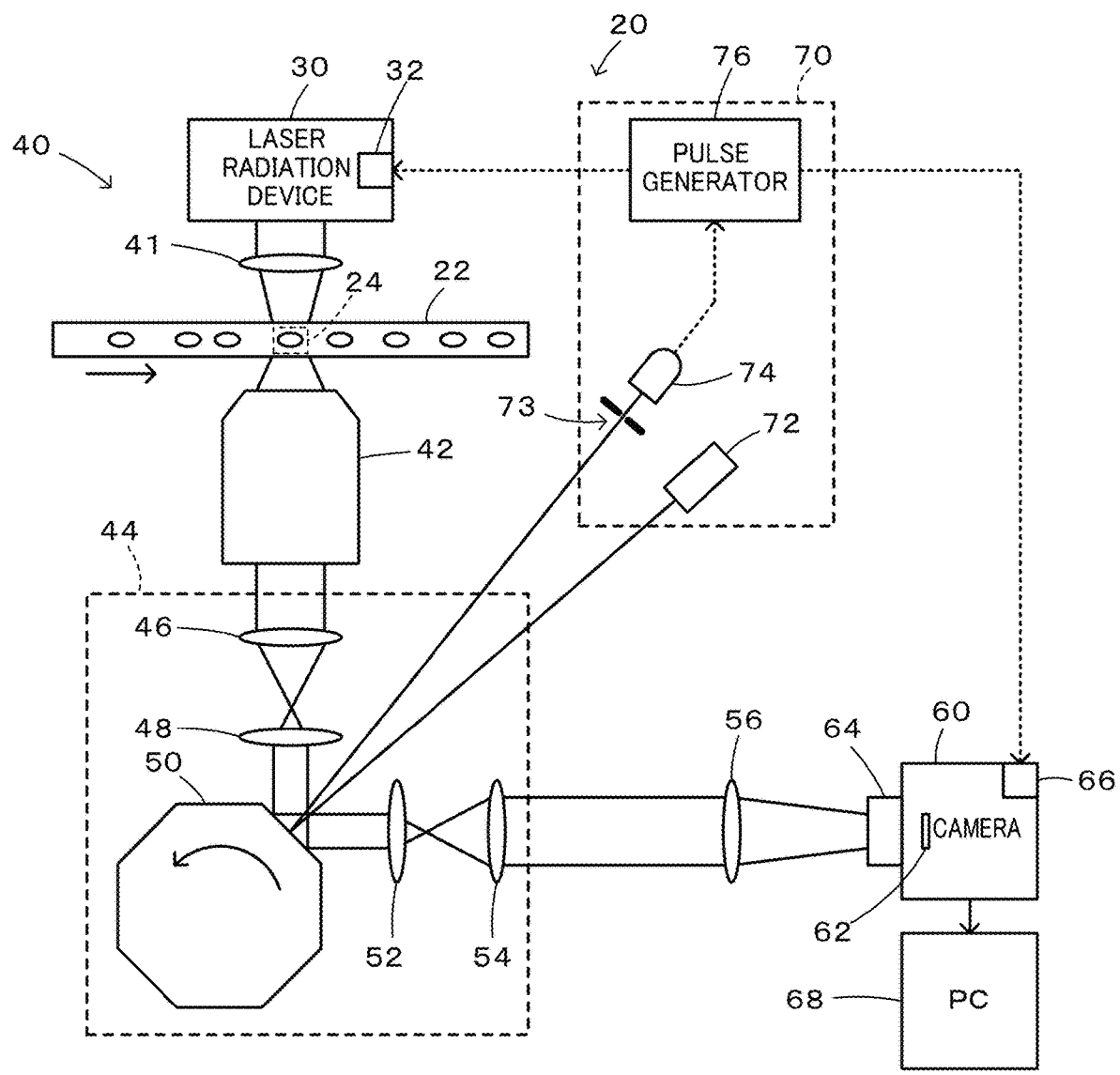
FIG. 1 is a configuration diagram illustrating the schematic configuration of a flow cytometer 20 according to a first embodiment of the present disclosure.

FIG. 1 is a configuration diagram illustrating the schematic configuration of a flow cytometer 20 according to a first embodiment. The flow cytometer 20 of the first embodiment includes a flow cell 22 in which an imaging object flows uniformly in a direction of an arrow shown in FIG. 1; a laser radiation device 30 configured to emit laser beam; a camera 60; an optical system 40 configured to introduce the laser beam emitted from the laser radiation device 30 to an imaging range 24 of the flow cell 22 and to introduce signal light from the imaging range 24 of the flow cell 22 to the camera 60: and a timing adjustment device 70 configured to adjust an imaging timing.

The laser radiation device 30 is configured as a known laser radiation device to emit parallel laser beams and includes a driver 32 that is provided to control emission of the laser beam. The driver 32 is activated by input of a pulse signal to emit the laser beam at a rise of the pulse signal and to stop emission of the laser beam at a fall of the pulse signal. Accordingly, input of a pulse signal having a pulse width corresponding to a desired time period into the driver 32 enables laser beam to be emitted for the time period corresponding to the pulse width.

The camera 60 is configured as a known camera provided with an image sensor 62 that is configured by an sCMOS (scientific CMOS) having N×M pixels and includes a driver 66 that serves to control opening and closing of a shutter 64 and to transfer data of the image sensor 62 to a PC (computer) 68 connected with the camera 60. The driver 66 is activated by input of a pulse signal to open the shutter 64 at a rise of the pulse signal and to close the shutter 64 at a fall of the pulse signal. Accordingly, input of a pulse signal having a pulse width corresponding to a desired time period into the driver 32 enables the shutter 64 to be opened for the time period corresponding to the pulse width. According to the first embodiment, for the purpose of the higher speed operation, a rolling shutter mode is employed to open the shutter 64. The PC 68 performs various image analyses and the like using imaged data.

The optical system 40 includes a radiation lens 41 configured to introduce the laser beam emitted from the laser radiation device 30 to the imaging range 24 of the flow cell 22; an objective lens 42 configured to receive signal light (light such as transmitted light, reflected light, scattered light, or fluorescent light) input from the imaging range 24 of the flow cell 22; an imaging optical system 44 configured to receive signal light input from the objective lens 42; and an adjustment lens 56 configured to input signal light from the imaging optical system 44 into the camera 60. The imaging optical system 44 includes an imaging lens 46 that is configured to focus the signal light from the objective lens 42; an adjustment lens 48 that is configured to reconvert the light from the imaging lens 46 into parallel beams; a polygon scanner 50; an adjustment lens 52 that has similar functions to those of the adjustment lens 48 and that is configured to focus parallel beams from the polygon scanner 50; and an adjustment lens 54 that is configured to reconvert the focused light from the adjustment lens 52 into parallel beams. The polygon scanner 50 is formed as a regular polygonal prism to have mirrors formed on respective side faces and is rotated about a center axis of the regular polygonal prism as a rotating shaft.

According to the first embodiment, the laser radiation device 30, the polygon scanner 50 and the camera 60 are arranged such that when the angle of an mirror on a side face of the polygon scanner 50 opposed to the adjustment lens 48 and the adjustment lens 52 (hereinafter referred to as "opposed mirror") is 45 degrees, the laser beam emitted from the center of the laser radiation device 30 is reflected by the opposed mirror of the polygon scanner 50 and enters a center pixel of the image sensor 62 of the camera 60. In the imaging optical system 44, light of each wavelength is provided as parallel beams from the adjustment lens 48 to the adjustment lens 52 by the function of Fourier transform. Each surface in an optical path from the adjustment lens 48 to the adjustment lens 52 may thus be regarded as a Fourier plane (i.e., a surface where a Fourier transform pattern of an object image is formed or a surface where a point light source on an object surface makes parallel beams). It is accordingly thought that the opposed mirror of the polygon scanner 50 is placed on a Fourier plane.

According to the first embodiment, the rotation speed of the polygon scanner 50 and the flow rate of the flow cell 22 are adjusted such that a center image of the imaging range 24 in the flow cell 22 is input into a center pixel (identical pixel) of the image sensor 62 of the camera 60 for a predetermined time period (time period of, for example, 10 μsec or 20 μsec) around a timing when the angle of the opposed mirror of the polygon scanner 50 is 45 degrees. More specifically, in the state that an image (signal light) of an object point located at the center of the imaging range 24 is input into a center pixel of the image sensor 62 at the timing when the opposed mirror surface of the polygon scanner 50 is at 45 degrees, the rotation speed of the polygon scanner 50 and the flow rate of the flow cell 22 are adjusted such that an image (signal light) of an object point located on a slightly upstream side of the center of the imaging range 24 is input into the center pixel of the image sensor 62 at a timing prior to the timing when the opposed mirror surface of the polygon scanner 50 is at 45 degrees by half the predetermined time period and that an image (signal light) of an object point located on a slightly downstream side of the center of the imaging range 24 is input into the center pixel of the image sensor 62 at a timing subsequent to the timing when the opposed mirror surface of the polygon scanner 50 is at 45 degrees by half the predetermined time period. By taking into account such adjustment of the rotation speed of the polygon scanner 50 and the flow rate of the flow cell 22 and placement of the polygon scanner 50 on the Fourier plane, the image (signal light) of each part of an imaging object flowing in the imaging range 24 of the flow cell 22 is input into the identical pixel of the image sensor 62 of the camera 60 for the predetermined time period around the timing when the angle of the opposed mirror of the polygon scanner 50 is 45 degrees. Accordingly, even the exposure for the predetermined time period around the timing when the angle of the opposed mirror of the polygon scanner 50 is 45 degrees suppresses image blurring and the like and provides a clearer image.

Furthermore, according to the first embodiment, the flow rate of the flow cell 22 and the number of angles in the regular polygonal prism of the polygon scanner 50 are adjusted such that a required time period from a time when the angle of an opposed mirror of the polygon scanner 50 reaches 45 degrees to a time when the angle of a subsequent opposed mirror becomes equal to 45 degrees by rotation of the polygon scanner 50 becomes equal to or shorter than a time period required for the flow of an imaging object by the distance of the imaging range 24 by the flow in the flow cell 22. This configuration enables the imaging object flowing in the flow cell 22 to be imaged thoroughly.

The timing adjustment device 70 includes a laser beam irradiator 72 configured to irradiate the opposed mirror of the polygon scanner 50 with laser beam; a laser beam detector 74 configured to detect laser beam that is reflected by the opposed mirror of the polygon scanner 50 and that passes through a slit 73; and a pulse generator 76 configured to generate a laser irradiation pulse and a shutter opening pulse when laser beam is detected by the laser beam detector 74. The pulse generator 76 sends the laser irradiation pulse to the driver 32 of the laser radiation device 30, while sending the shutter opening pulse to the driver 66 of the camera 60. According to the first embodiment, the laser beam irradiator 72, the slit 73 and the laser beam detector 74 are arranged such that the laser beam that is emitted from the laser beam irradiator 72 and that is reflected by the opposed mirror surface of the polygon scanner 50 is detected via the slit 73 by the laser beam detector 74 at a timing slightly earlier than a timing when the angle of the opposed mirror of the driving and rotating polygon scanner 50 is 45 degrees. The shutter opening pulse is generated to rise when the laser beam is detected by the laser beam detector 74 and to fall after a predetermined time period or a longer time has elapsed since exposure of all the lines (pixels) of the image sensor 62. The laser irradiation pulse is generated to rise after the exposure of all the lines (pixels) of the image sensor 62 and to fall when a predetermined time period (time period of approximately 10 μsec or 20 μsec) has elapsed.

Figure 2:
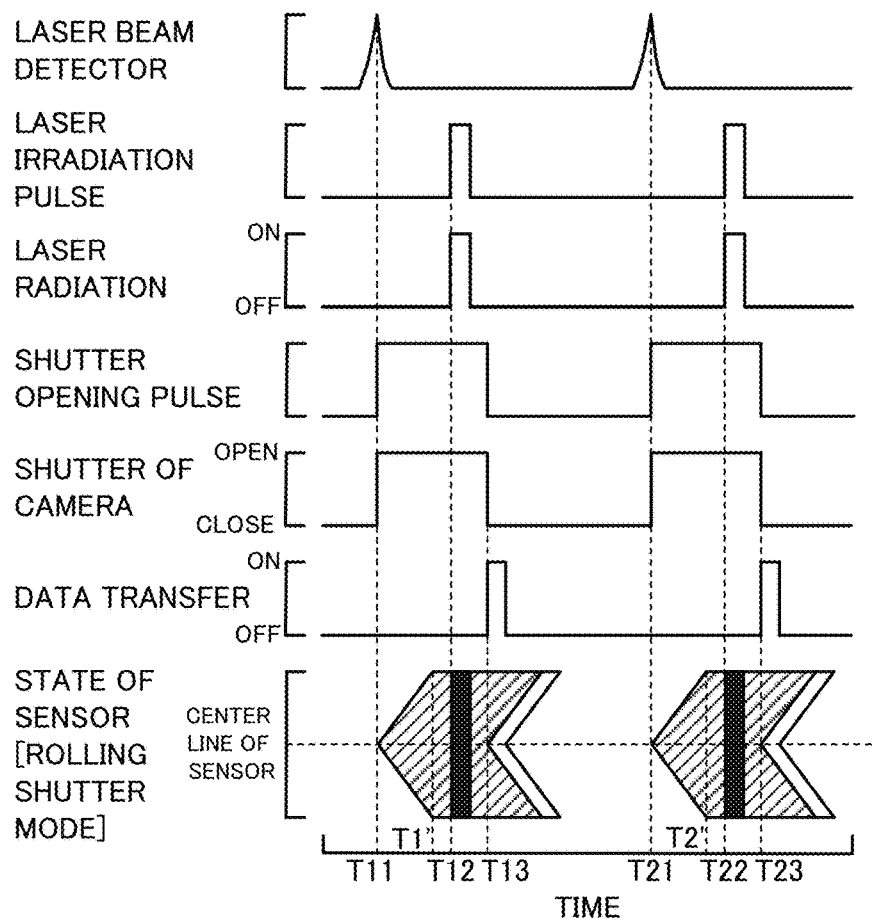

FIG. 2 is a diagram showing time changes of detection of laser beam by the laser beam detector 74, laser radiation from the laser radiation device 30, opening/closing of the shutter 64 of the camera 60 and the like. FIG. 2 shows, sequentially from the top, time changes of detection of laser beam by the laser beam detector 74, output of the laser irradiation pulse by the pulse generator 76, laser radiation by the laser radiation device 30, output of the shutter opening pulse by the pulse generator 76, opening/closing of the shutter 64 of the camera 60, transfer of data of the image sensor 62 of the camera 60 to the PC 68, and the state of the image sensor 62 (exposure, laser radiation and data transfer) in the camera 60 set in the rolling shutter mode. With regard to the state of the image sensor 62 in the rolling shutter mode, the exposure of the image sensor 62 is shown by hatching: the laser radiation is shown by filling in black; and the data transfer is shown by filling in white. The same applies to the state of the image sensor 62 in modifications and second and subsequent embodiments described below. Laser beam is detected by the laser beam detector 74 at a time T11 (time T21), and the laser irradiation pulse and the shutter opening pulse are generated by the pulse generator 76. As described above, the shutter opening pulse is generated as a pulse rising when laser beam is detected by the laser beam detector 74. The laser irradiation pulse is generated as a pulse rising after a time T1' (time T2') when all the lines (pixels) of the image sensor 62 are exposed. The driver 66 of the camera 60 which receives the input shutter opening pulse, opens the shutter 64 at a rise of the pulse at the time T11 (time T21). The camera 60 is set in the rolling shutter mode, so that the respective lines of the image sensor 62 are sequentially exposed from a center line toward end lines of the image sensor 62. The driver 32 of the laser radiation device 30 which receives the input laser irradiation pulse at a time T12 (time T22) after the time T1' (time T2') when all the lines (pixels) of the image sensor 62 are exposed, starts radiation of laser beam at a rise of the pulse at the time T12 (time T22) and stops radiation of the laser beam at a fall of the pulse after elapse of a predetermined time period (time period of approximately 10 μsec or 20 μsec). At a time T13 (time T23) when the shutter opening pulse falls, the driver 66 of the camera 60 closes the shutter 64 and starts transfer of data of the image sensor 62 (data obtained by exposure) to the PC 68. The camera 60 is set in the rolling shutter mode, so that the respective lines of the image sensor 62 are sequentially subjected to stop of exposure from the center line toward the end lines of the image sensor 62 and are also sequentially subjected to data transfer from the center line toward the end lines of the image sensor 62 when the shutter 64 is closed.

As understood from this diagram of FIG. 2, it is preferable that the timing when the angle of the opposed mirror of the driving and rotating polygon scanner 50 is 45 degrees is the middle of radiation of laser beam for the predetermined time period. Accordingly, the timing when the laser beam is detected by the laser beam detector 74 is the timing prior to the timing when the angle of the opposed mirror of the polygon scanner 50 is 45 degrees by a time period slightly longer than a time period required for exposure of all the pixels when the camera 60 is set in the rolling shutter mode and the shutter 64 is opened (a time period from the time T11 (time T 21) to the time T1' (time T2') in FIG. 2). According to the first embodiment, the laser beam irradiator 72, the slit 73 and the laser beam detector 74 are arranged to provide this timing.

In the flow cytometer 20 of the first embodiment described above, when the shutter 64 of the camera 60 is opened at the timing of detection of laser beam by the laser beam detector 74, and laser beam is emitted from the laser radiation device 30 for predetermined time period (time period of approximately 10 μsec or 20 μsec) when all the pixels of the image sensor 62 are exposed. The rotation speed of the polygon scanner 50 and the flow rate of the flow cell 22 are adjusted such that the image (signal light) of each part of the imaging object flowing in the imaging range 24 of the flow cell 22 is input into the identical pixel of the image sensor 62 of the camera 60 for the predetermined time period (time period of approximately 10 μsec or 20 μsec) around the timing when the opposed mirror of the polygon scanner 50 placed on the Fourier plane of the imaging optical system 44 is at 45 degrees. Accordingly, even the exposure for the predetermined time period suppress image blurring due to movement of the imaging object and provides a clearer image, compared with exposure for a very short time period. The flow rate of the flow cell 22 and the number of angles in the regular polygonal prism of the polygon scanner 50 are adjusted such that the required time period from the time when the angle of a opposed mirror of the polygon scanner 50 reaches 45 degrees to the time when the angle of a subsequent opposed mirror becomes equal to 45 degrees by rotation of the polygon scanner 50 becomes equal to or shorter than the time period required for the flow of the imaging object by the distance of the imaging range 24 by the flow in the flow cell 22. This configuration enables the imaging object flowing in the flow cell 22 to be imaged thoroughly. As a result, this configuration increases the flow rate in the flow cell 22 and enables a larger number of imaging objects to be imaged more clearly for a short time period.

In the flow cytometer 20 of the first embodiment, when laser beam is detected by the laser beam detector 74, the pulse generator 76 generates the shutter opening pulse, which rises at the time of detection of laser beam by the laser beam detector 74 and falls after elapse of the predetermined time period since exposure of all the lines (pixels) of the image sensor 62, and sends the shutter opening pulse to the driver 66 of the camera 60. The pulse generator 76 also generates the laser irradiation pulse, which rises after exposure of all the lines (pixels) of the image sensor 62 and falls after elapse of the predetermined time period, and sends the laser irradiation pulse to the driver of the laser radiation device 30. According to a modification, when laser beam is detected by the laser beam detector 74, the pulse generator 76 may generate a pulse, which immediately rises and subsequently immediately falls and send the pulse to the driver 66 of the camera 60 and to the driver 32 of the laser radiation device 30. In this modification, the driver 66 of the camera 60 may be programmed to immediately open the shutter 64 in response to input of the pulse from the pulse generator 76, to close the shutter 64 after elapse of a total time period of a required time period for exposure of all the lines (pixels) of the image sensor 62 and a predetermined time period, and to start transfer of data of the image sensor 62 to the PC 68 at the timing of closing the shutter 64. The driver 32 of the laser radiation device 30 may be programmed to radiate laser for a predetermined time period at a timing after elapse of a time period required for exposure of all the lines (pixels) of the image sensor 62 since input of the pulse from the pulse generator 76.

Figure 3:
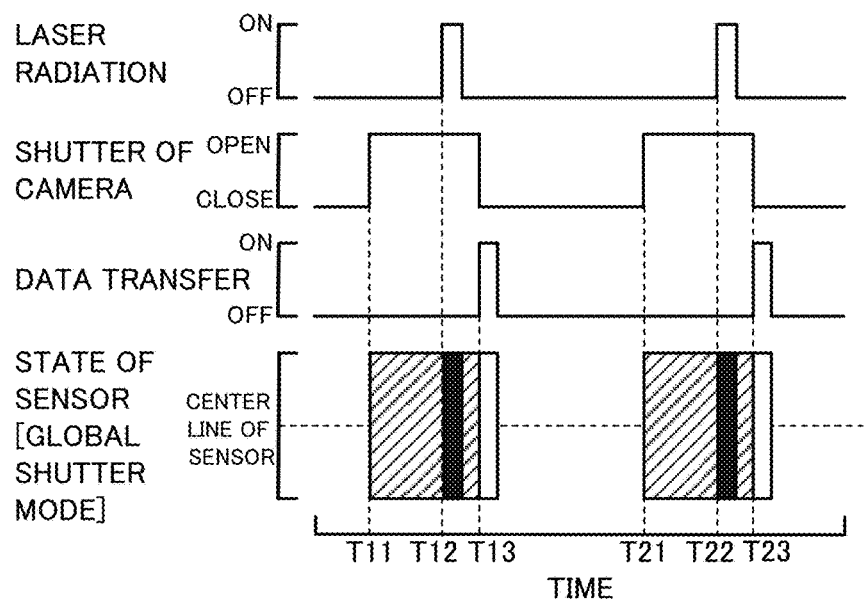
FIG. 3 is a diagram showing opening/closing of the shutter and laser radiation in a global shutter mode.
Figure 4:
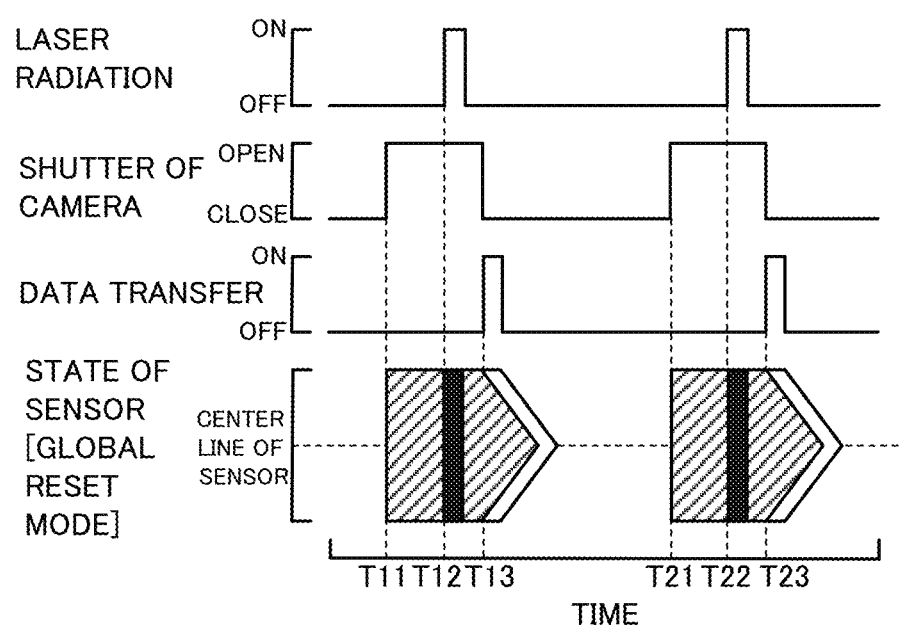
FIG. 4 is a diagram showing time changes of laser radiation, opening/closing of the shutter 64 of the camera 60 and the like in a global reset mode.

In the flow cytometer 20 of the first embodiment, the camera 60 is set in the rolling shutter mode. According to a modification, the camera 60 may be set in the global shutter mode. In this modification, as shown in FIG. 3, all the pixels of the image sensor 62 are exposed simultaneously with opening of the shutter 64. Accordingly, the timing of laser radiation by the laser radiation device 30 may be any time after the timing when the shutter 64 is opened. In circuit design of a CMOS camera, the rolling shutter mode and the global reset mode have the higher frame rate and are more suitable for the higher speed imaging, compared with the global shutter mode. FIG. 4 shows time changes of laser radiation, opening/closing of the shutter 64 of the camera 60 and the like in the global reset mode.

In the flow cytometer 20 of the first embodiment, the laser irradiation pulse and the shutter opening pulse are generated by using the laser beam irradiator 72, the slit 73 and the laser beam detector 74 that are arranged and adjusted to cause the laser beam that is radiated from the laser beam irradiator 72 at the timing slightly earlier than the timing when the angle of the opposed mirror of the driving and rotating polygon scanner 50 becomes equal to 45 degrees and that is reflected by the opposed mirror surface of the polygon scanner 50, to be detected via the slit 73 by the laser beam detector 74. The laser beam is radiated based on this laser irradiation pulse, and the shutter 64 of the camera 60 is opened and closed based on the shutter opening pulse. A modification may be provided with a sensor configured to detect a rotational angle of the polygon scanner 50. A laser irradiation pulse and a shutter opening pulse may be generated at an angle detected by the sensor corresponding to a timing slightly earlier than a timing when the angle of each mirror of the polygon scanner 50 as the opposed mirror becomes equal to 45 degrees. The laser beam may be radiated based on this laser irradiation pulse, and the shutter 64 of the camera 60 may be opened and closed based on the shutter opening pulse.

Figure 5:
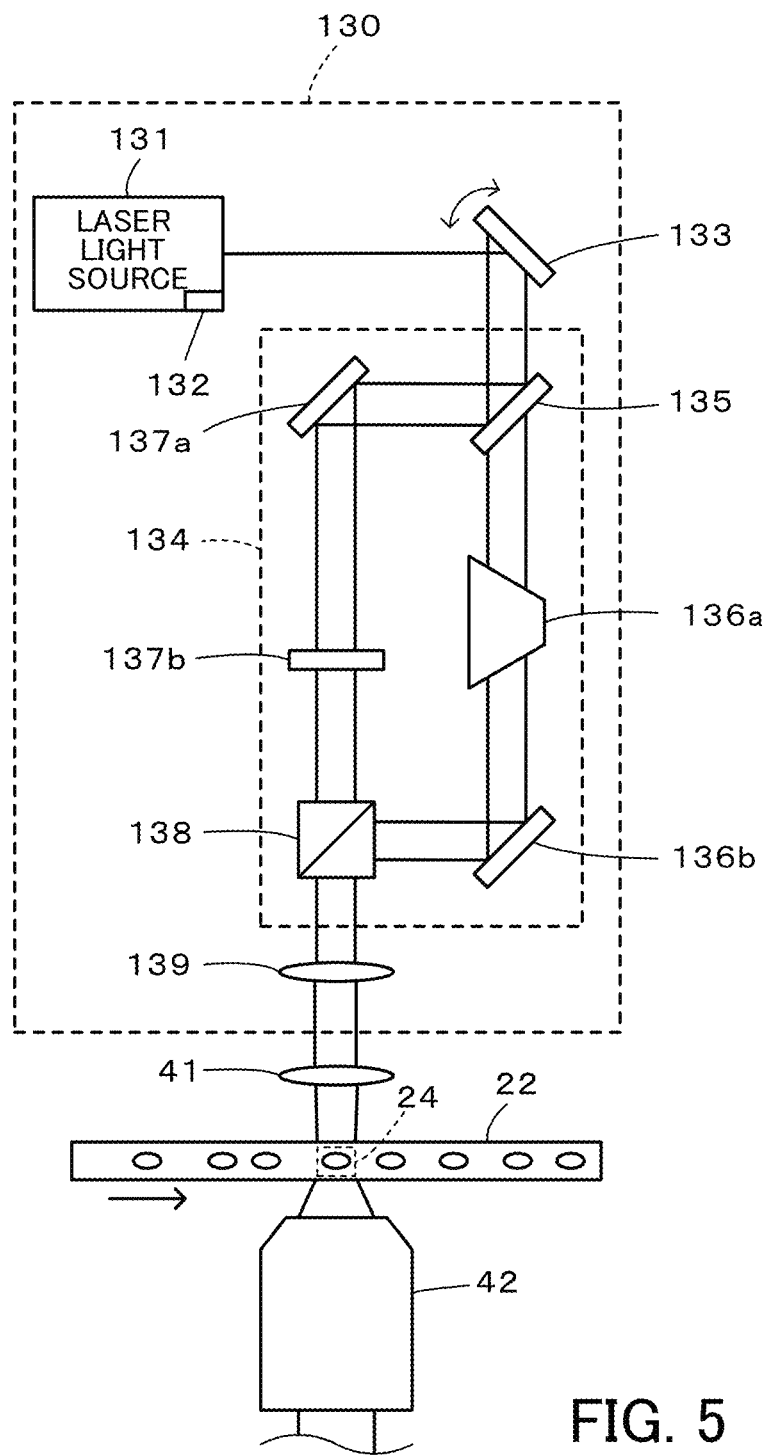
FIG. 5 is a configuration diagram illustrating the schematic configuration of a laser radiation device 130 according to a modification.

In the flow cytometer 20 of the first embodiment, the camera 60 is set in the rolling shutter mode, and laser beam is emitted from the laser radiation device 30 for the predetermined time period after exposure of all the lines (pixels) of the image sensor 62. According to a modification, laser beam may be emitted from the laser radiation device 30 for the predetermined time period prior to exposure of all the lines (pixels) of the image sensor 62. In this case, a laser radiation device 130 of a modification illustrated in FIG. 5 may be used in place of the laser radiation device 30. The laser radiation device 130 of the modification includes a laser light source 131 configured to emit laser beam; a driver 132 configured to control emission of laser beam from the laser light source 131; a Galvano scanner 133 configured to perform scanning with changing the irradiation position of the laser beam from the laser light source 131; a laser beam converter 134 configured to convert the laser beam from the Galvano scanner 133 into two symmetrical laser beams; and a cylindrical lens 139 configured to convert the two symmetrical laser beams from the laser beam converter 134 into two symmetrical flat laser beams. The laser beam converter 134 includes a beam splitter 135 configured to separate the laser beam from the Galvano scanner 133 into two; a dove prism 136a configured to invert laser beam transmitted through the beam splitter 135; a mirror 136b configured to change the traveling direction of laser beam from the dove prism 136a by 90 degrees; a mirror 137a configured to change the traveling direction of laser beam reflected by the beam splitter 135, by 90 degrees; a polarizer 137b configured to polarize laser beam from the mirror 137a in a horizontal direction or in a vertical direction; and a polarizing beam splitter 138 configured to polarize laser beam from the mirror 136b in a direction that is different by 90 degrees from the polarizer 137b and to superpose the polarized laser beam on laser beam from the polarizer 137b. This configuration of the laser beam converter 134 converts one laser beam into two symmetrical laser beams having different polarizing directions.

Figure 6:
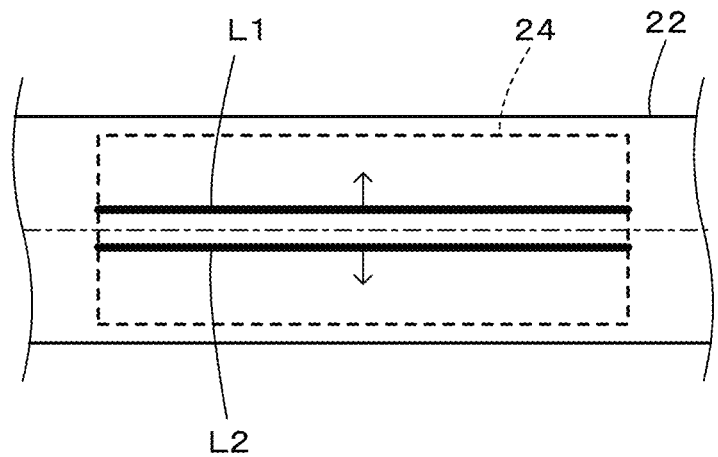
FIG. 6 is a diagram illustrating one example of irradiation of an imaging range 24 with two symmetrical flat laser beams L1 and L2 emitted from the laser radiation device 130.
Figure 7:
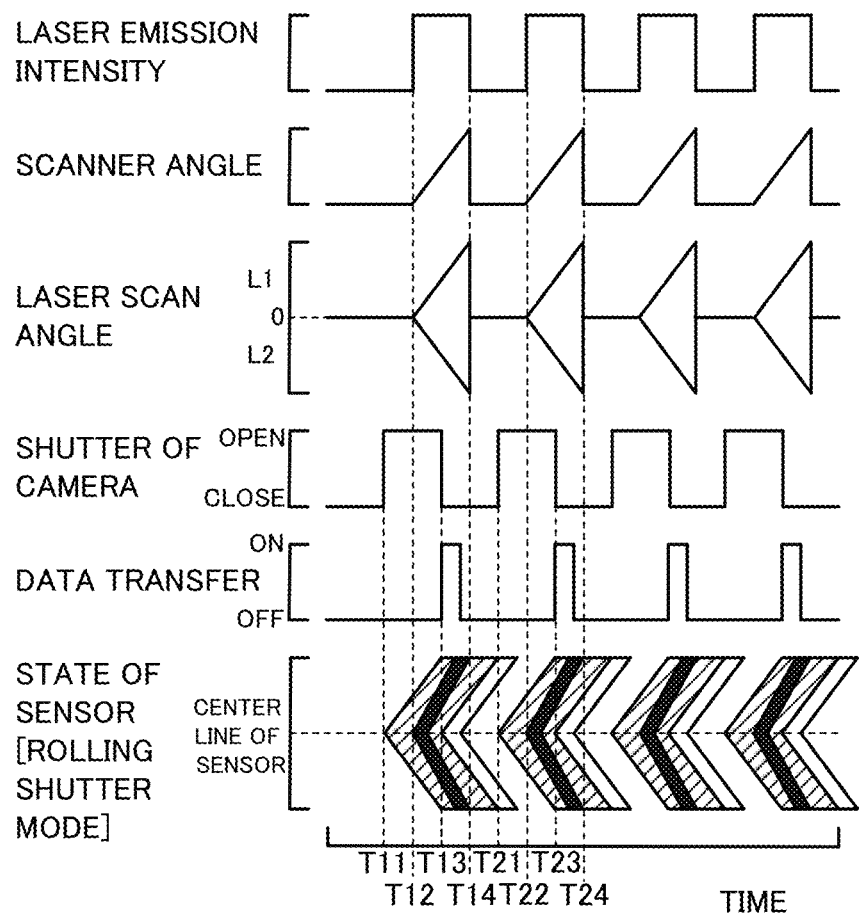
FIG. 7 is a diagram showing time changes of laser emission intensity, scanner angle, opening/closing of the shutter 64 and the like in the case of imaging with the laser radiation device 130 of the modification.

FIG. 6 is a diagram illustrating one example of irradiation of an imaging range 24 with two symmetrical flat laser beams L1 and L2 emitted from the laser radiation device 130. The laser beams L1 and L2 are emitted symmetrically with respect to a center line in the flow direction of the imaging range 24 to scan in directions of arrows shown in FIG. 6 from the center line toward respective ends. FIG. 7 is a diagram showing time changes of the laser emission intensity, the scanner angle, opening/closing of the shutter 64 and the like in the case of imaging with the laser radiation device 130 of the modification. FIG. 7 shows, sequentially from the top, time changes of the laser emission intensity of the laser light source 131, the scanner angle of the Galvano scanner 133, the laser scan angle, opening/closing of the shutter 64 of the camera 60, transfer of data of the image sensor 62 of the camera 60 to the PC 68, and the state of exposure, laser radiation and data transfer of the image sensor 62 in the camera 60 set in the rolling shutter mode. When the shutter 64 is opened at a time T11 (time T21), respective lines of the image sensor 62 are sequentially exposed from a center line toward end lines of the image sensor 62. Laser radiation is started at a time T12 (time T22) prior to exposure of all the pixels of the image sensor 62. This starts scanning from the center to the respective ends in the imaging range 24 by the Galvano scanner 133 and starts irradiation of the imaging range 24 with the two symmetrical flat laser beams L1 and L2 sequentially moving from a center line toward end lines. At a time T13 (time T23), the shutter 64 of the camera 60 is closed. At a time T14 (time T24), emission of the laser beams L1 and L2 is stopped. As described above, in the rolling shutter mode, respective lines of the image sensor 62 are sequentially exposed from the center line toward the end lines of the image sensor 62 when the shutter 64 is opened, and the laser beams L1 and L2 also scan from the center line toward the end lines. Even when exposure of all the pixels of the image sensor 62 is not completed, the imaging range 24 can be imaged as long as a pixel in which the laser beams L1 and L2 are input has been exposed. As a result, this configuration allows for exposure of the imaging range at the higher speed and for the shorter time period. The respective lines of the image sensor 62 are sequentially exposed to the laser beams L1 and L2 for the predetermined time period from the center line toward the end lines of the image sensor 62. This provides a clearer image, like the first embodiment. The sequence of the lines that are sequentially exposed in the rolling shutter mode is not limited to the setting described above. Other available settings include a setting of sequentially exposing respective lines from the upper and lower ends toward the center; a setting of sequentially exposing respective lines downward from the upper end and the center; a setting of sequentially exposing respective lines upward from the lower end and the center; a setting of sequentially exposing respective lines (only in a lower half of the sensor) downward from the center; and a setting of sequentially exposing respective lines (only in an upper half of the sensor) upward from the center. In any of such settings, laser beams are sequentially moved in the sequence of the exposure.

Figure 8:
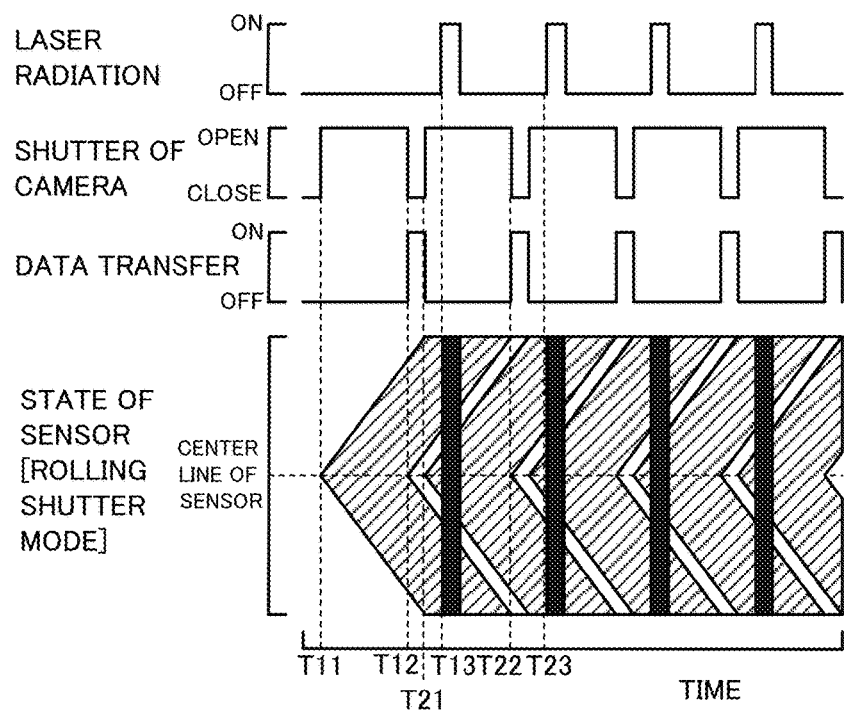
FIG. 8 is a diagram showing time changes of laser radiation, opening/closing of the shutter 64 of the camera, data transfer and the state of an image sensor 62 when laser radiation is across two consecutive frames.
Figure 9:
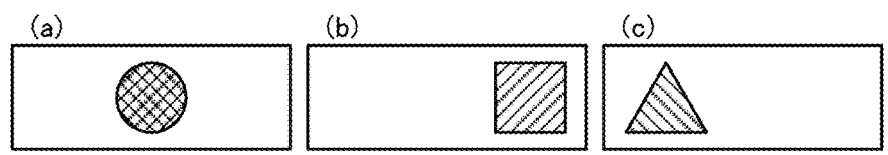
FIG. 9 is a diagram illustrating one example of images (a) to (c) of the imaging range 24.
Figure 10:
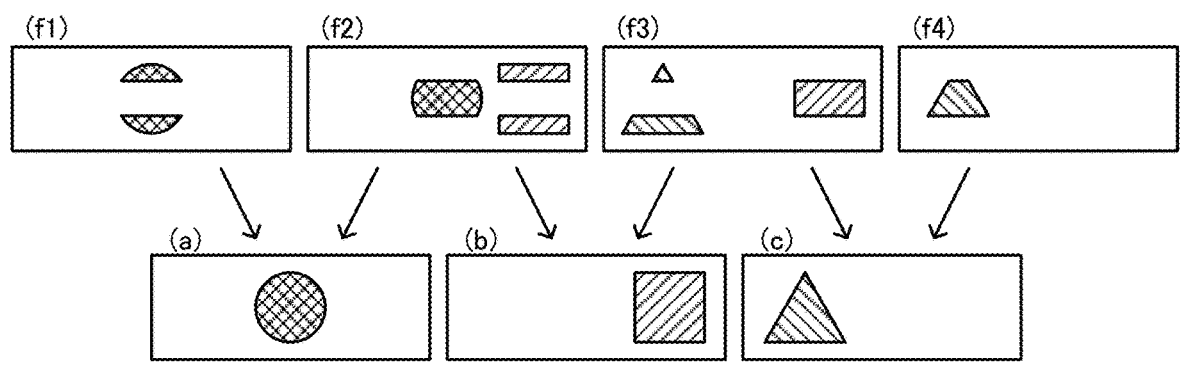
FIG. 10 is a diagram illustrating formation of the images (a) to (c) of the imaging range 24 from four consecutive frames (f1) to (f4)

In the flow cytometer 20 of the first embodiment, the camera 60 is set in the rolling shutter mode, and laser beam is emitted from the laser radiation device 30 for the predetermined time period after exposure of all the lines (pixels) of the image sensor 62. This causes the imaging range 24 to be imaged in one frame. When the camera 60 is set in the rolling shutter mode, a modification may image the imaging range 24 across two consecutive frames and form an image of the imaging range 24 by image processing. FIG. 8 is a diagram showing time changes of laser radiation, opening/closing of the shutter 64 of the camera, data transfer and the state of the image sensor 62 when opening/closing of the shutter 64 of the camera 60 and data transfer are performed sequentially to cause laser radiation across two consecutive frames. FIG. 9 is a diagram illustrating one example of images (a) to (c) of the imaging range 24. FIG. 10 is a diagram illustrating formation of the images (a) to (c) of the imaging range 24 from four consecutive frames (f1) to (f4). The shutter 64 of the camera 60 is opened at a time T11 (time T21) and is closed at a time T12 (time T22). In the rolling shutter mode, opening and closing of the shutter 64 are sequentially performed from the center line toward the end lines of the image sensor 62, so that respective lines of the image sensor 62 are sequentially subjected to exposure and data transfer from the center line toward the end lines of the image sensor 62. This series of operations is repeated. Accordingly, when laser radiation is performed at a time T13 after a time T21 when end lines of a first frame at a left end in the drawing are exposed and a center line of a subsequent second frame is exposed, the end line sides are exposed in the first frame and the center line side is exposed in the second frame. When laser radiation is performed a total of four times with regard to the images (a) to (c) of FIG. 9 that sequentially appear in the imaging range 24 at the similar timings, images of the four frames (f1) to (f4) shown by the upper half of FIG. 10 are exposed in the four frames. Combining the image on the end line sides of each previous frame with the image on the center line side of each subsequent frame out of each pair of two adjacent frames in the obtained four frames (f1) to (f4) gives the images (a) to (c) shown by the lower half of FIG. 10. Even in the case of imaging of the imaging range 24 across two consecutive frames, such image processing performed by the PC 68 gives the respective images.

Embodiment 2

Figure 11:
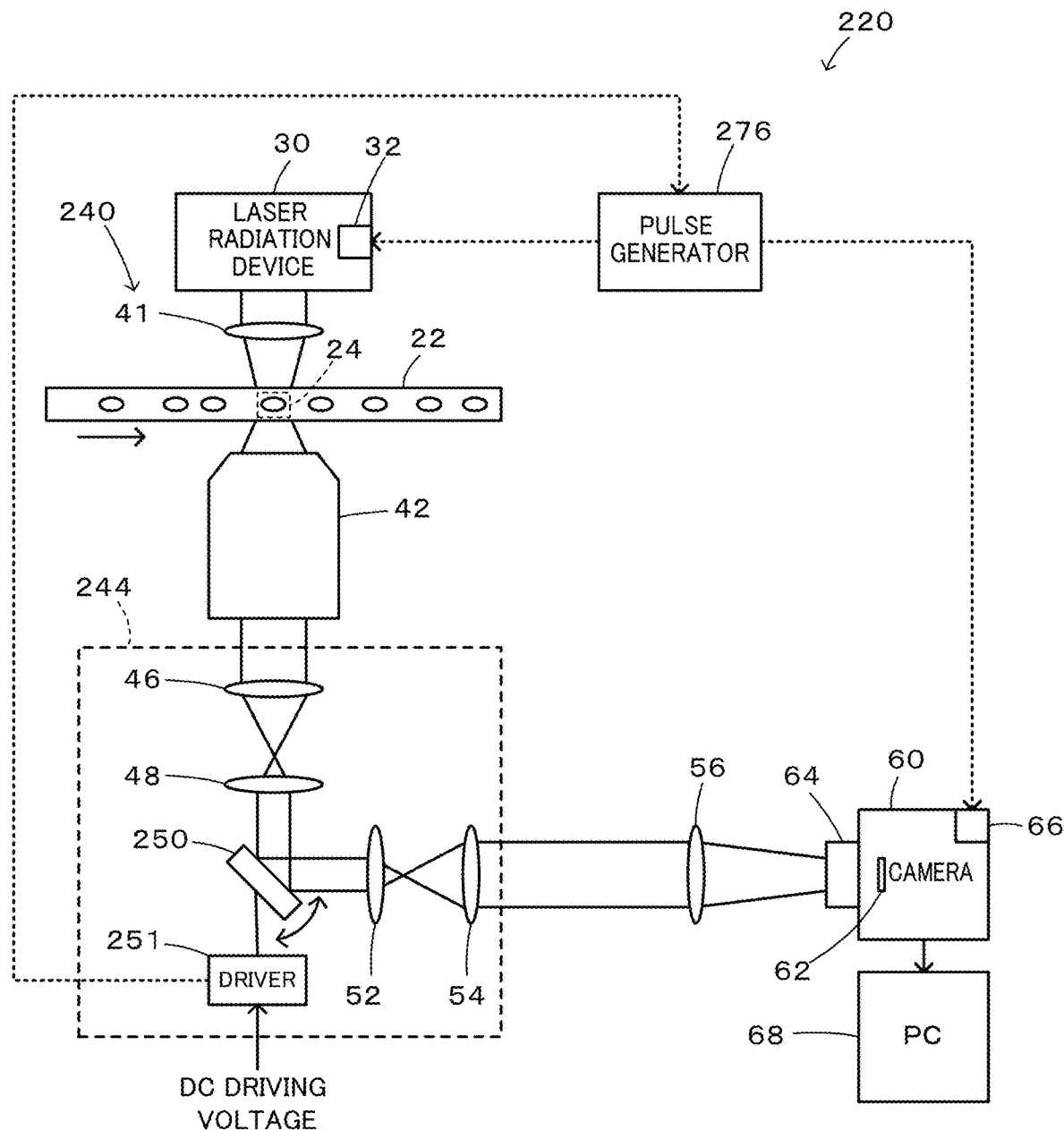
FIG. 11 is a configuration diagram illustrating the schematic configuration of a flow cytometer 220 according to a second embodiment of the present disclosure.

FIG. 11 is a configuration diagram illustrating the schematic configuration of a flow cytometer 220 according to a second embodiment of the present disclosure. As understood from comparison between FIG. 1 and FIG. 11, the flow cytometer 220 of the second embodiment has a similar configuration to that of the flow cytometer 20 of the first embodiment, except that a resonant galvanometric scanner 250 and its driver 251 are provided in place of the polygon scanner 50, that the laser beam irradiator 72 and the laser beam detector 74 are not provided for detection of the position of the opposed mirror of the polygon scanner 50, and that a pulse generator 276 configured to generate pulses based on a reference signal from the driver 251 of the resonant galvanometric scanner 250 is provided in place of the pulse generator 76 configured to generate the pulses based on the signal from the laser beam detector 74. In order to avoid duplicated explanation, like components of the flow cytometer 220 of the second embodiment to the components of the flow cytometer 20 of the first embodiment are expressed by like reference signs, and their detailed description is omitted.

The flow cytometer 220 of the second embodiment includes the resonant galvanometric scanner 250 placed on a Fourier plane of an imaging optical system 244 provided in an optical system 240; the driver 251 configured to drive and vibrate this resonant galvanometric scanner 250; and the pulse generator 276 configured to generate a shutter opening pulse based on a reference signal from the driver 251 and send the shutter opening pulse to the driver 66 of the camera 60 and to generate a laser irradiation pulse based on the reference signal and send the laser irradiation pulse to the driver 32 of the laser radiation device 30. The driver 251 receives supply of a DC driving voltage and is driven to vibrate the resonant galvanometric scanner 250 at predetermined cycles in a rotating direction shown by a two-direction arrow of FIG. 11. The cycle of this vibration and the flow rate of the flow cell 22 are adjusted such that an image (signal light) of each part of an imaging object flowing in the imaging range 24 of the flow cell 22 is input into an identical pixel of the image sensor 62 of the camera 60 for a predetermined time period (time period of approximately 10 μsec or 20 μsec) around a timing when a mirror surface of the resonant galvanometric scanner 250 is at 45 degrees. The driver 251 also serves to send a pulse that rises at a predetermined phase of each cycle of the vibration, as the reference signal, to the pulse generator 276. The pulse generator 276 generates the laser irradiation pulse based on the reference signal such that the timing when the mirror surface of the resonant galvanometric scanner 250 is at 45 degrees is a middle timing of the predetermined time period (time period of approximately 10 μsec or 20 μsec) and sends the laser irradiation pulse to the driver 32 of the laser radiation device 30. The pulse generator 276 also generates the shutter opening pulse, which rises to provide the timing of a rise of the laser irradiation pulse after exposure of all the pixels of the image sensor 62 in the rolling shutter mode and falls after the timing of a fall of the laser irradiation pulse, based on the reference signal and sends the shutter opening pulse to the driver 66 of the camera 60.

Figure 12:
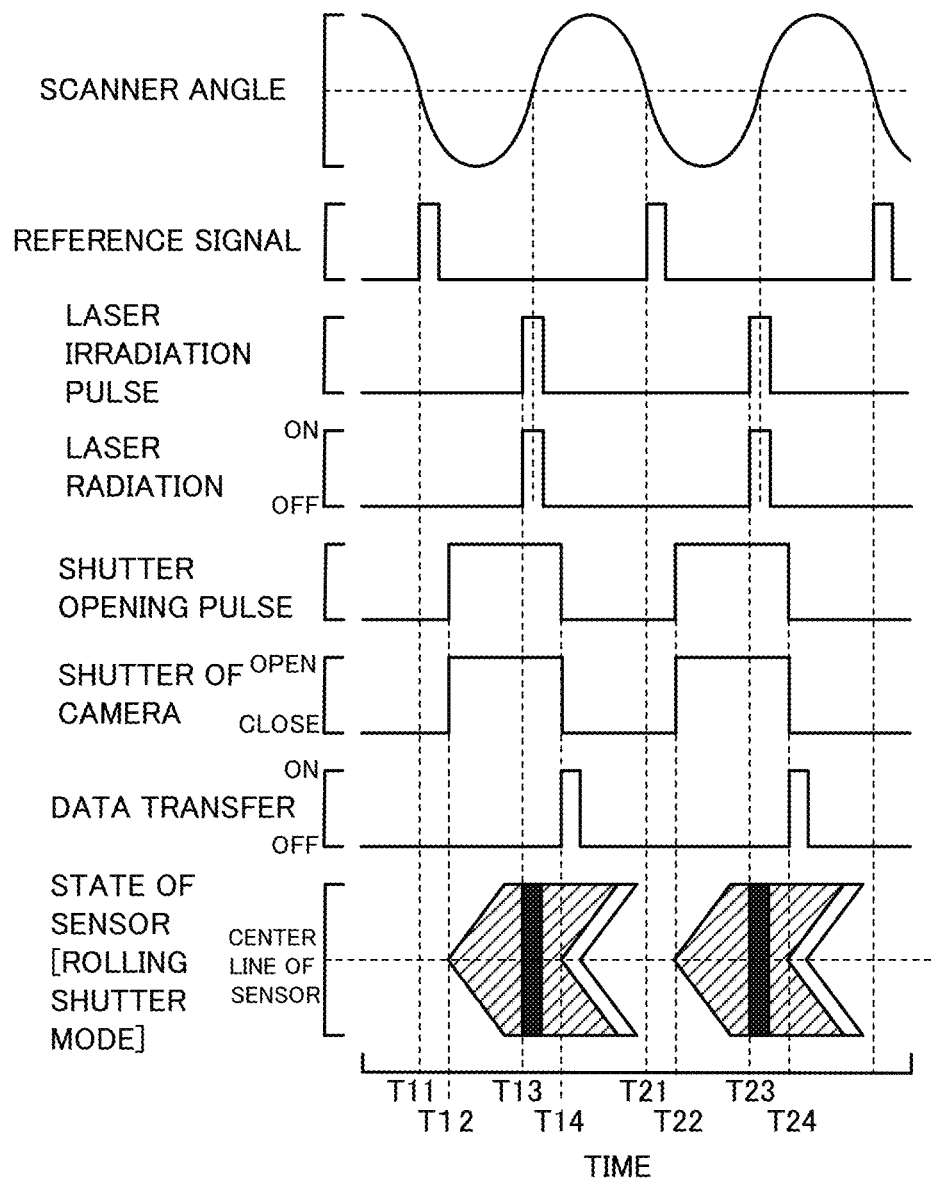
FIG. 12 is a diagram showing time changes of scanner angle of a resonant galvanometric scanner 250, laser radiation from a laser radiation device 30, opening/closing of a shutter 64 of a camera 60 and the like in the flow cytometer 220 of the second embodiment.

FIG. 12 is a diagram showing time changes of the scanner angle of the resonant galvanometric scanner 250, laser radiation from the laser radiation device 30, opening/closing of the shutter 64 of the camera 60 and the like in the flow cytometer 220 of the second embodiment. FIG. 12 shows, sequentially from the top, time changes of the scanner angle of the resonant galvanometric scanner 250, the reference signal (pulse) sent from the driver 251 to the pulse generator 276, output of the laser irradiation pulse by the pulse generator 276, laser radiation by the laser radiation device 30, output of the shutter opening pulse by the pulse generator 276, opening/closing of the shutter 64 of the camera 60, transfer of data of the image sensor 62 of the camera 60 to the PC 68, and the state of the image sensor 62 (exposure, laser radiation and data transfer) in the camera 60 set in the rolling shutter mode. In the example of FIG. 12, a pulse of the reference signal rises at a phase π in a sine curve of the scanner angle, and the angle of the mirror surface of the resonant galvanometric scanner 250 becomes equal to 45 degrees at a phase 2π. When the reference signal is sent at a time T11 (time T21) of the phase π, the laser irradiation pulse is generated to rise at a time T13 (time T23) such that the phase 2π becomes the center of a predetermined time period and to fall after elapse of the predetermined time period. The shutter opening pulse is also generated to rise at a time T12 (time T22) such that the timing of the rise of the laser irradiation pulse is provided after exposure of all the pixels of the image sensor 62 and to fall at a time T14 (time T24) after the timing of the fall of the laser irradiation pulse. At the time T12 (time T22) when the shutter opening pulse rises, the shutter 64 of the camera 60 is opened. At the time T14 (time T24) when the shutter opening pulse falls, the shutter 64 of the camera 60 is closed. The camera 60 is set in the rolling shutter mode, so that respective lines of the image sensor 62 are sequentially exposed from the center line toward the end lines of the image sensor 62 when the shutter 64 is opened and are sequentially subjected to stop of exposure and data transfer from the center line toward the end lines of the image sensor 62 when the shutter 64 is closed. Laser beam is radiated at the time T13 (time T23)

after exposure of all the pixels of the image sensor 62. The radiation of laser beam is then stopped after elapse of a predetermined time period.

In the flow cytometer 220 of the second embodiment described above, the resonant galvanometric scanner 250 is placed on the Fourier plane of the imaging optical system 244. The amplitude of vibration of the resonant galvanometric scanner 250 and the flow rate of the flow cell 22 are adjusted such that the image (signal light) of each part of the imaging object flowing in the imaging range 24 of the flow cell 22 is input into the identical pixel of the image sensor 62 of the camera 60 for the predetermined time period (time period of approximately 10 μsec or 20 μsec) around the timing when the mirror surface of the resonant galvanometric scanner 250 is at 45 degrees. The flow cytometer 220 generates the laser irradiation pulse such that the timing when the mirror surface of the resonant galvanometric scanner 250 is at 45 degrees is the middle timing of the predetermined time period (time period of approximately 10 μsec or 20 μsec), based on the reference signal output at each predetermined phase of the amplitude of vibration from the driver 251 of the resonant galvanometric scanner 250, and performs laser radiation. The flow cytometer 220 also generates the shutter opening pulse, which rises to provide the timing of a rise of the laser irradiation pulse after exposure of all the pixels of the image sensor 62 and falls after the timing of a fall of the laser irradiation pulse, based on the reference signal and opens and closes the shutter 64 of the camera 60. Accordingly, even the exposure for the predetermined time period suppress image blurring and provides a clearer image, compared with exposure for a very short time period.

In the flow cytometer 220 of the second embodiment, laser radiation is performed with generation of the laser irradiation pulse such that the timing when the mirror surface of the resonant galvanometric scanner 250 is at 45 degrees is the middle timing of the predetermined time period, based on the reference signal from the driver 251 of the resonant galvanometric scanner 250. The shutter 64 of the camera 60 is opened and closed with generation of the shutter opening pulse, which rises to provide the timing of a rise of the laser irradiation pulse after exposure of all the pixels of the image sensor 62 and falls after the timing of a fall of the laser irradiation pulse, based on the reference signal. According to a modification, the reference signal from the driver 251 of the resonant galvanometric scanner 250 may be directly input into the driver 32 of the laser radiation device 30 and into the driver 66 of the camera 60. In this modification, the driver 32 of the laser radiation device 30 may be programmed to perform laser radiation for a predetermined time period such that the timing when the angle of the mirror surface of the resonant galvanometric scanner 250 becomes equal to 45 degrees is the middle timing of the predetermined time period, based on the reference signal. The driver 66 of the camera 60 may be programmed to open the shutter 64 such that laser radiation is started after exposure of all the pixels of the image sensor 62, based on the reference signal, to close the shutter 64 after termination of the laser radiation, and to start transfer of data of the image sensor 62 to the PC 68 at the timing of closing the shutter 64.

In the flow cytometer 220 of the second embodiment, the camera 60 is set in the rolling shutter mode. According to a modification, the camera 60 may be set in the global shutter mode. In this modification, all the pixels of the image sensor 62 are exposed simultaneously with opening of the shutter 64. Accordingly, the timing of laser radiation by the laser radiation device 30 may be any time after the timing when the shutter 64 is opened. The camera 60 may also be set in the global reset mode.

Embodiment 3

Figure 13:
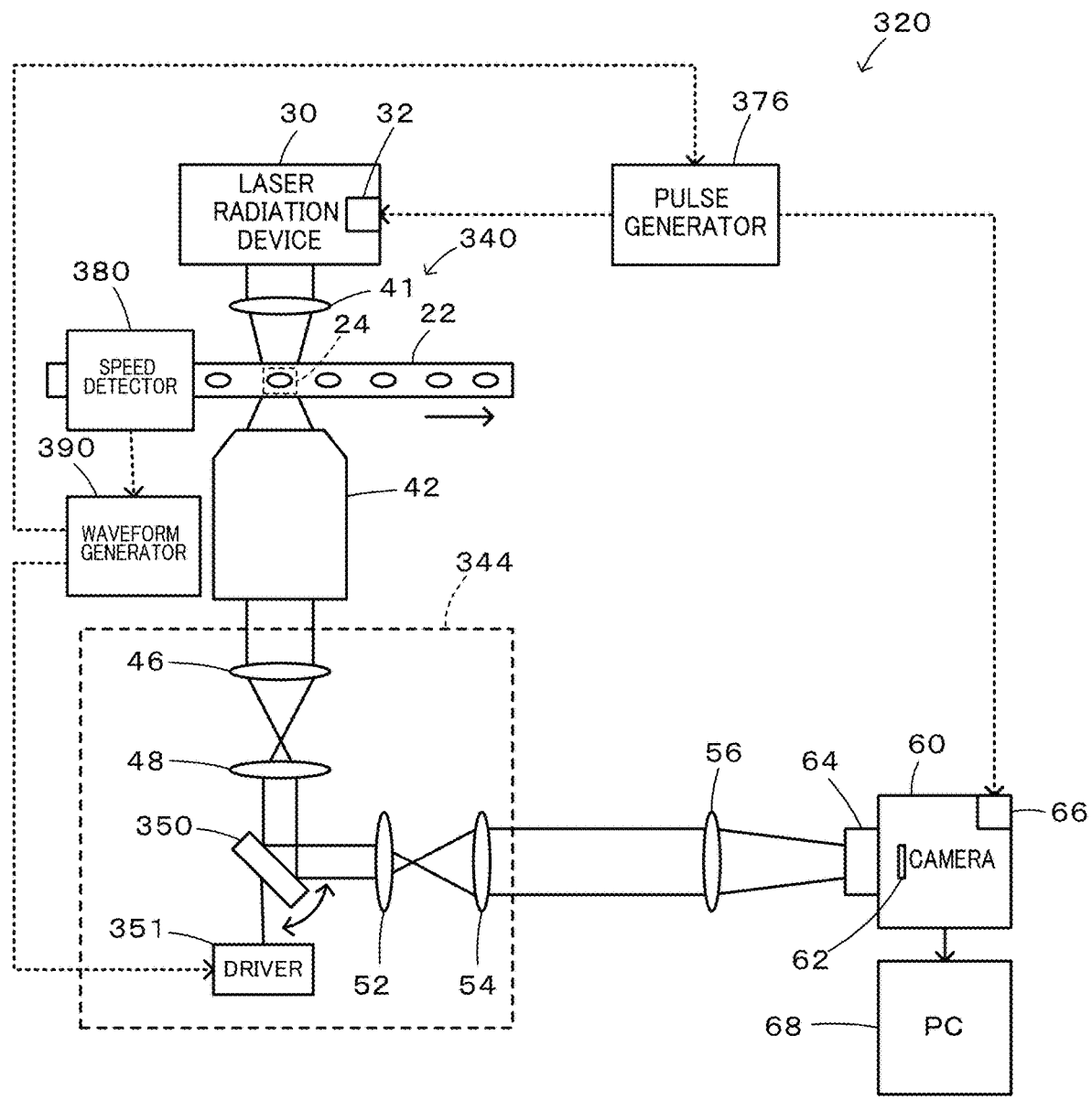
FIG. 13 is a configuration diagram illustrating the schematic configuration of a flow cytometer 320 according to a third embodiment of the present disclosure.

FIG. 13 is a configuration diagram illustrating the schematic configuration of a flow cytometer 320 according to a third embodiment of the present disclosure. As understood from comparison between FIG. 1 and FIG. 13, the flow cytometer 320 of the third embodiment has a similar configuration to that of the flow cytometer 20 of the first embodiment, except that a Galvano scanner 350 and its driver 351 are provided in place of the polygon scanner 50, that the laser beam irradiator 72 and the laser beam detector 74 are not provided for detection of the position of the opposed mirror of the polygon scanner 50, that the flow cells 22 is provided with a speed detector 380 configured to detect the speed of an imaging object and a waveform generator 390, and that a pulse generator 376 configured to generate pulses based on a reference signal from the waveform generator 390 is provided in place of the pulse generator 76 configured to generate the pulses based on the signal from the laser beam detector 74. In order to avoid duplicated explanation, like components of the flow cytometer 320 of the third embodiment to the components of the flow cytometer 20 of the first embodiment are expressed by like reference signs, and their detailed description is omitted.

The flow cytometer 320 of the third embodiment includes the speed detector 380 placed on an upstream side of the imaging range 24 of the flow cell 22; the waveform generator 390 configured to generate a reference signal and a driver driving signal based on a signal from the speed detector 380; the Galvano scanner 350 placed on a Fourier plane of an imaging optical system 344 provided in an optical system 340; the driver 351 configured to drive the Galvano scanner 350 in response to the driver driving signal from the waveform generator 390; and the pulse generator 376 configured to generate a shutter opening pulse based on the reference signal from the waveform generator 390 and send the shutter opening pulse to the driver 66 of the camera 60 and to generate a laser irradiation pulse based on the reference signal and send the laser irradiation pulse to the driver 32 of the laser radiation device 30.

Figure 14:
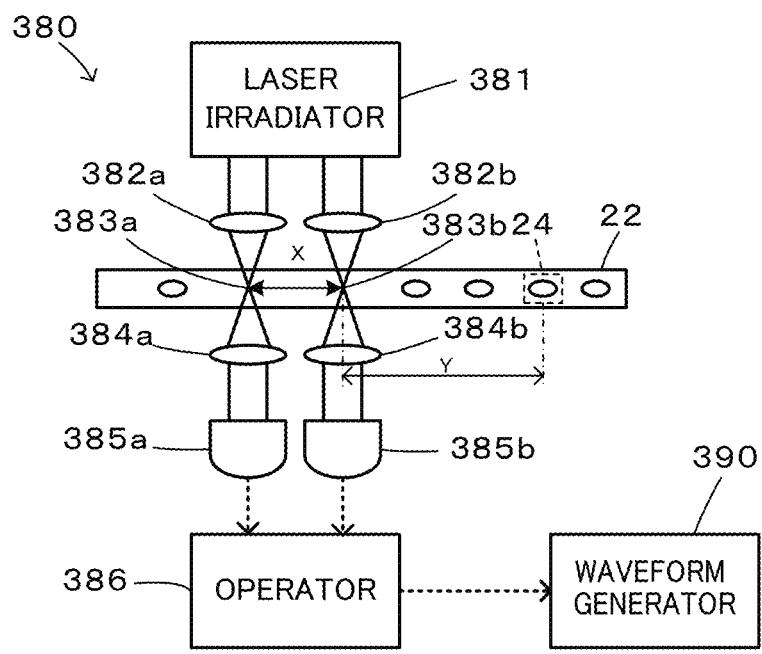
FIG. 14 is a configuration diagram illustrating the schematic configuration of a speed detector 380.
Figure 15:
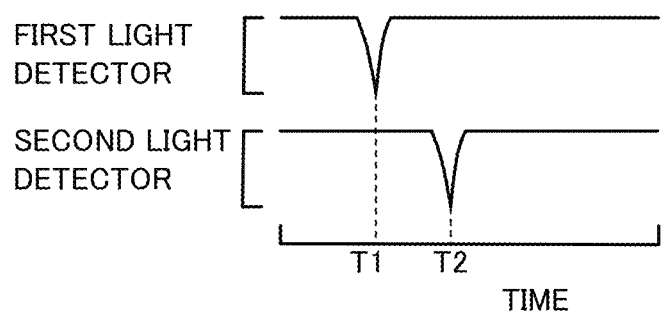
FIG. 15 is a diagram showing one example of time changes of light intensity detected by a first light detector 385a and a second light detector 385b.

FIG. 14 is a configuration diagram illustrating the schematic configuration of the speed detector 380. The speed detector 380 includes a laser irradiator 381; two adjustment lenses 382a and 382b configured to irradiate two irradiation points 383a and 383b of the flow cell 22 with laser beam from the laser irradiator 381; two adjustment lenses 384a and 384b configured to adjust signal lights (transmitted lights) from the irradiation points 383a and 383b to parallel lights; a first light detector 385a and a second light detector 385b configured to detect light intensities of signal lights from the adjustment lenses 384a and 384b; and an operator 386 configured to calculate a speed of an imaging object and an arrival timing when the imaging object reaches the imaging range 24, based on the light intensities detected by the first light detector 385a and the second light detector 385b. When a plurality of imaging objects appear in the imaging range 24, an average value of the speeds of these imaging objects is calculated. The light intensities detected by the first light detector 385a and by the second light detector 385b are decreased when the imaging object reaches the irradiation points 383a and 383b in the flow cell 22 as illustrated in FIG. 15. The speed of the imaging object may be calculated by dividing a distance x between the irradiation points 383a and 383b by an interval (T2−T1) between a time T1 when the light intensity is decreased in the first light detector 385a and a time T2 when the light intensity is decreased in the second light detector 385b. The arrival timing may be calculated by a distance y between the irradiation point 383b on the downstream side and the middle of the imaging range 24 by the speed of the imaging object, as a time period elapsed from the time T2 when the light intensity is decreased in the second light detector 385b.

The waveform generator 390 generates a pulse as a reference signal, based on the arrival timing from the operator 386 of the speed detector 380 and sends the reference signal to the pulse generator 376. The waveform generator 390 also generates a driver driving signal for driving the Galvano scanner 350, based on the speed and the arrival timing of the imaging object from the operator 386 of the speed detector 380 and sends the driver driving signal to the driver 351. The reference signal is generated as a pulse, which rises at an earlier timing than the arrival timing by a time period that is longer than a required time period from opening of the shutter 64 to exposure of all the pixels of the image sensor 62 in the camera 60 set in the rolling shutter mode by a predetermined time period (time period of approximately 10 μsec or 20 μsec) or longer. The driver driving signal is a driving signal provided to drive and rotate the mirror surface of the Galvano scanner 350 from (45−α) degrees to (45+α) degrees around 45 degrees. The arrival timing is the timing when the mirror surface is 45 degrees. The rotation speed of the Galvano scanner 350 is determined according to the speed of the imaging object such that an image (signal light) of each part of an imaging object flowing in the imaging range 24 of the flow cell 22 is input into an identical pixel of the image sensor 62 of the camera 60 for a predetermined time period (time period of approximately 10 μsec or 20 μsec) around the timing when the mirror surface of the Galvano scanner 350 is at 45 degrees.

The pulse generator 376 generates the laser irradiation pulse such that the arrival timing is a middle timing of the predetermined time period (time period of approximately 10 μsec or 20 μsec), based on the reference signal from the waveform generator 390 and sends the laser irradiation pulse to the driver 32 of the laser radiation device 30. The pulse generator 376 also generates the shutter opening pulse, which rises to provide the timing of a rise of the laser irradiation pulse after exposure of all the pixels of the image sensor 62 in the rolling shutter mode and falls after the timing of a fall of the laser irradiation pulse, based on the reference signal and sends the shutter opening pulse to the driver 66 of the camera 60.

Figure 16:
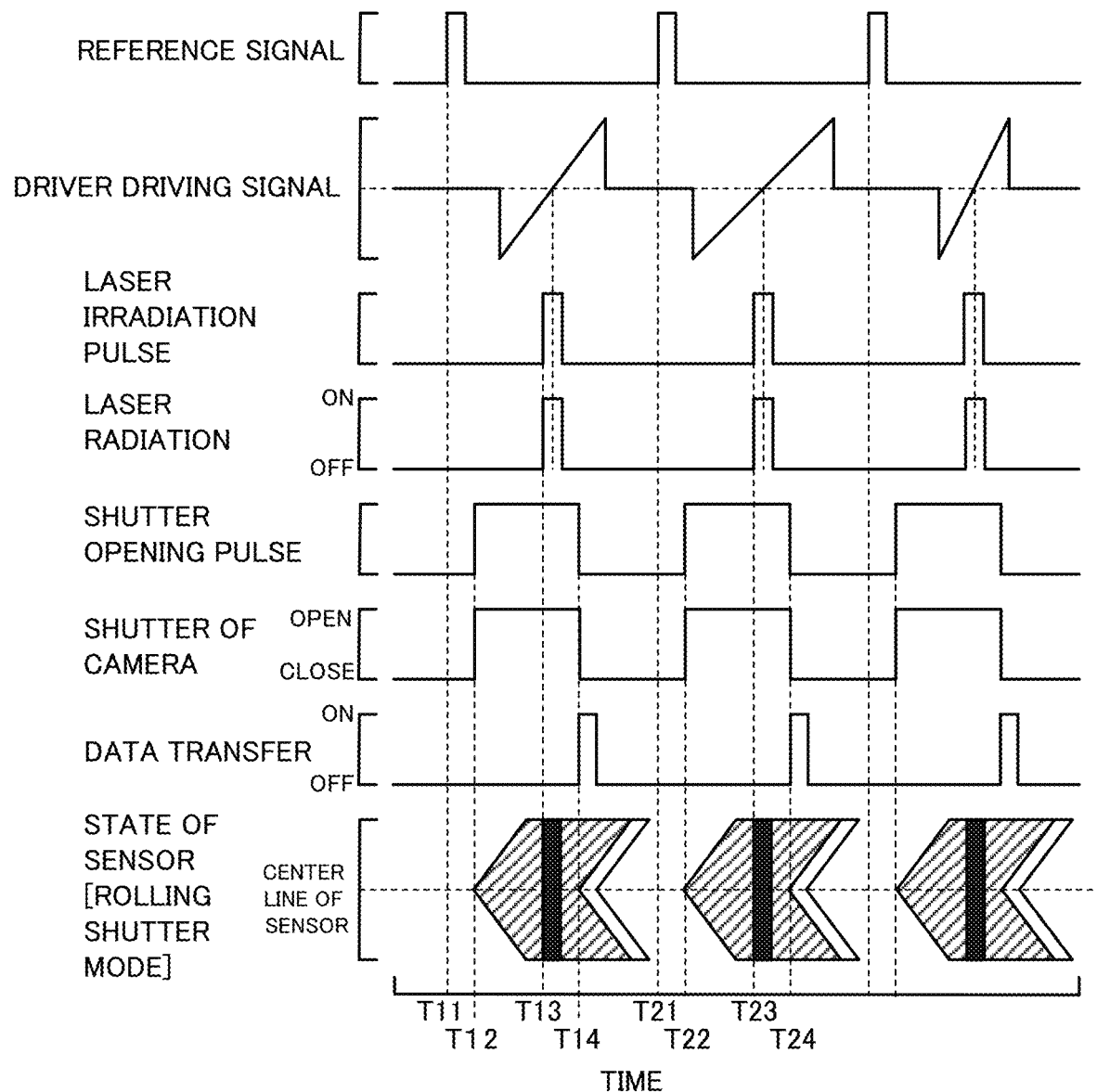
FIG. 16 is a diagram showing time changes of reference signal, driver driving signal, laser radiation from a laser radiation device 30, opening/closing of a shutter 64 of a camera 60 and the like in the flow cytometer 320 of the third embodiment.

FIG. 16 is a diagram showing time changes of the reference signal, the driver driving signal, laser radiation from the laser radiation device 30, opening/closing of the shutter 64 of the camera 60 and the like in the flow cytometer 320 of the third embodiment. FIG. 16 shows, sequentially from the top, time changes of the reference signal (pulse) sent from the waveform generator 390 to the pulse generator 376, the driver driving signal sent from the waveform generator 390 to the driver 351, output of the laser irradiation pulse by the pulse generator 376, laser radiation by the laser radiation device 30, output of the shutter opening pulse by the pulse generator 376, opening/closing of the shutter 64 of the camera 60, transfer of data of the image sensor 62 of the camera 60 to the PC 68, and the state of the image sensor 62 (exposure, laser radiation and data transfer) in the camera 60 set in the rolling shutter mode. In the example of FIG. 16, when the reference signal is sent at a time T11 (time T21), the laser irradiation pulse is generated to rise at a time T13 (time T23) such that the arrival timing is the middle of the predetermined time period and to fall after elapse of the predetermined time period. The shutter opening pulse is also generated to rise at a time T12 (time T 22) such that the timing of a rise of the laser irradiation pulse is provided after exposure of all the pixels of the image sensor 62 and to fall at a time T14 (time T24) after the timing of a fall of the laser irradiation pulse. At the time T12 (time T22) when the shutter opening pulse rises, the shutter 64 of the camera 60 is opened. At the time T14 (time T24) when the shutter opening pulse falls, the shutter 64 of the camera 60 is closed. The camera 60 is set in the rolling shutter mode, so that respective lines of the image sensor 62 are sequentially exposed from the center line toward the end lines of the image sensor 62 when the shutter 64 is opened and are sequentially subjected to stop of exposure and data transfer from the center line toward the end lines of the image sensor 62 when the shutter 64 is closed. Laser beam is radiated at the time T13 (time T23) after exposure of all the pixels of the image sensor 62. The radiation of laser beam is then stopped after elapse of a predetermined time period. The gradient of the driver driving signal is determined according to the speed of the imaging object. The diagram shows that the speed of the second imaging object is lower than the speed of the first imaging object and that the speed of the third imaging object is higher than the speed of the first imaging object. Accordingly, even the exposure for the predetermined time period suppress image blurring and provides a clearer image, compared with exposure for a very short time period, by generating the driver driving signal according to the speed of the imaging object.

In the flow cytometer 320 of the third embodiment described above, the speed detector 380 detects the speed of the imaging object and the arrival timing when the imaging object reaches the middle of the imaging range 24. The flow cytometer 320 generates the driver driving signal such that the image (signal light) of each part of the imaging object flowing in the imaging range 24 of the flow cell 22 is input into the identical pixel of the image sensor 62 of the camera 60 for the predetermined time period (time period of approximately 10 μsec or 20 μsec) around the timing when the mirror surface of the Galvano scanner 350 is at 45 degrees, based on the speed and the arrival timing of the imaging object and drives the Galvano scanner 350, while performing opening/closing of the shutter 64 of the camera 60 and laser radiation. Even when respective imaging objects have different speeds, a clearer image is obtained by exposure of the respective imaging objects for the predetermined time period.

In the flow cytometer 320 of the third embodiment, laser radiation is performed with generation of the laser irradiation pulse such that the timing when the mirror surface of the Galvano scanner 350 is at 45 degrees is the middle timing of the predetermined time period, based on the reference signal from waveform generator 390. The shutter 64 of the camera 60 is opened and closed with generation of the shutter opening pulse, which rises to provide the timing of a rise of the laser irradiation pulse after exposure of all the pixels of the image sensor 62 and falls after the timing of a fall of the laser irradiation pulse, based on the reference signal. According to a modification, the reference signal from the waveform generator 390 may be directly input into the driver 32 of the laser radiation device 30 and into the driver 66 of the camera 60. In this modification, the driver 32 of the laser radiation device 30 may be programmed to perform laser radiation for a predetermined time period such that the timing when the angle of the mirror surface of the Galvano scanner 350 becomes equal to 45 degrees is the middle timing of the predetermined time period, based on the reference signal. The driver 66 of the camera 60 may be programmed to open the shutter 64 such that laser radiation is started after exposure of all the pixels of the image sensor 62, based on the reference signal, to close the shutter 64 after termination of the laser radiation, and to start transfer of data of the image sensor 62 to the PC 68 at the timing of closing the shutter 64.

In the flow cytometer 320 of the third embodiment, the camera 60 is set in the rolling shutter mode. According to a modification, the camera 60 may be set in the global shutter mode. In this modification, all the pixels of the image sensor 62 are exposed simultaneously with opening of the shutter 64. Accordingly, the timing of laser radiation by the laser radiation device 30 may be any time after the timing when the shutter 64 is opened. The camera 60 may also be set in the global reset mode.

Figure 17:
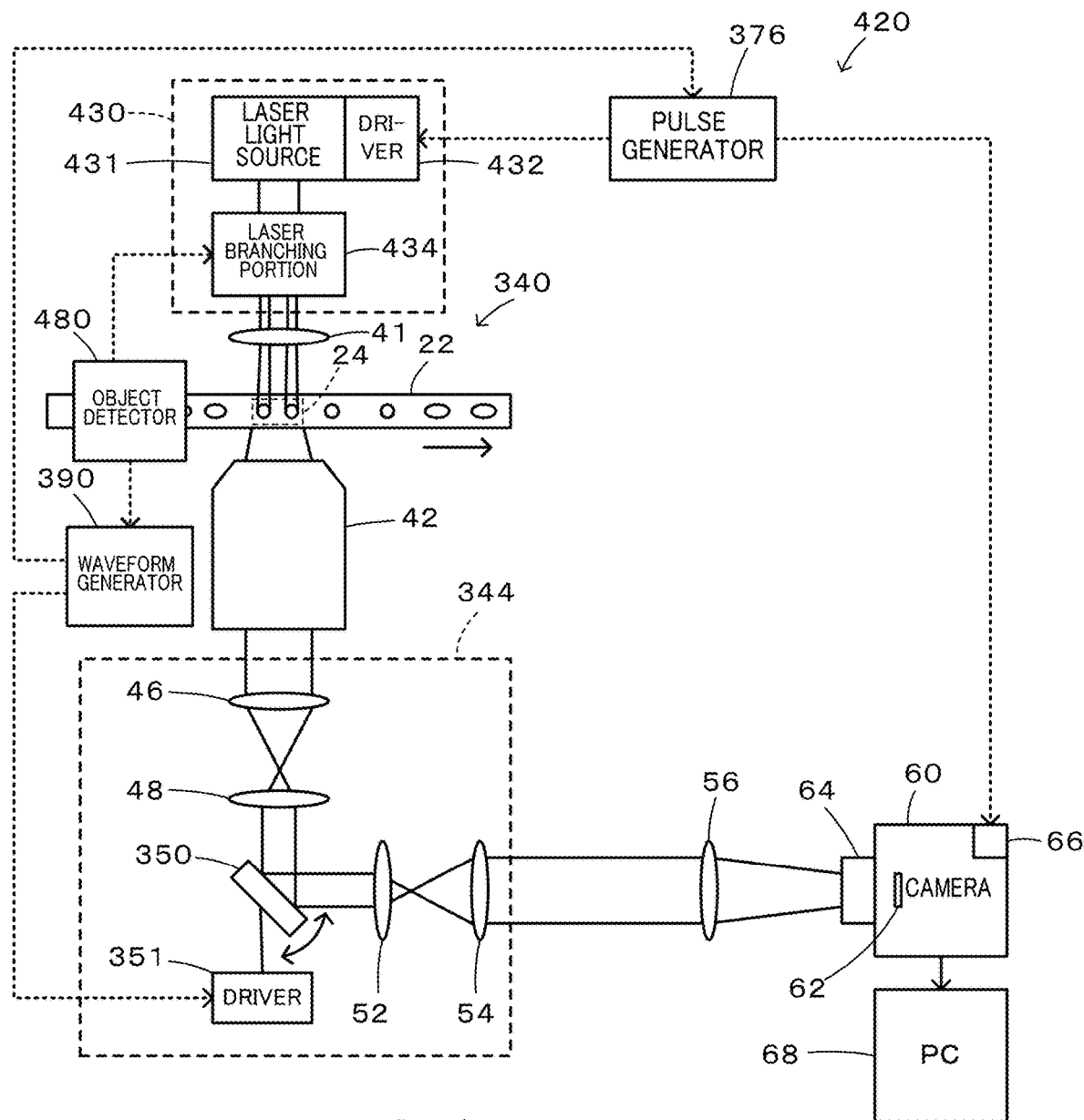
FIG. 17 is a configuration diagram illustrating the schematic configuration of a flow cytometer 420 according to a modification.

In the flow cytometer 320 of the third embodiment, the speed detector 380 detects the speed and the arrival timing of an imaging object. The flow cytometer 320 drives the Galvano scanner 350 based on the speed and the arrival timing of the imaging object, while performing opening/closing of the shutter 64 and laser radiation. Like a modification shown in FIG. 17, only an imaging object may be irradiated with laser beam, based on detection of the imaging object (the speed and the arrival timing of the imaging object) by an object detector 480 that has a similar configuration to that of the speed detector 380. In this modification, a laser radiation device 430 is configured to include a laser light source 431; a driver 432 that serves to control laser emission of the laser light source 431; a laser branching portion 434 that serves to branch off the laser beam from the laser light source 431 and irradiate only an imaging object in the imaging range 24 with the laser beam. Detection of the imaging object (the speed and the arrival timing of the imaging object) from the object detector 480 having the similar configuration to that of the speed detector 380 of FIG. 14 may be input into the laser branching portion 434. The laser branching portion 434 may be configured by using a known acousto-optical deflector to branch off the laser beam from the laser light source 431 into the number of imaging objects in the imaging range in the laser radiation process based on the detection of the imaging object (the speed and the arrival timing of the imaging object) from the object detector 480 and to adjust the irradiation direction (irradiation point) of each branched laser beam such as to irradiate only the imaging object in the imaging range 24 with the branched laser beam. This modified configuration enables only the imaging object to be irradiated with laser beam and suppresses deterioration of the image quality due to a signal of a part other than the imaging object (background), compared with a configuration that causes the part other than the imaging object to be also irradiated with laser beam.

In the flow cytometer 320 of the third embodiment, the speed detector 380 detects the speed and the arrival timing of the imaging object. The flow cytometer 320 drives the Galvano scanner 350 based on the speed and the arrival timing of the imaging object, while performing opening/closing of the shutter 64 and laser radiation. A modification may be configured without the speed detector 380 to generate a laser irradiation pulse and a scanner driving pulse for driving the Galvano scanner 350 at an operation timing of the camera 60 (for example, at a timing of termination of data transfer), to cause the driver 351 to drive the Galvano scanner 350 based on the generated scanner driving pulse, and to perform laser radiation based on the laser irradiation pulse. In this modification, the opening/closing timing of the shutter 64 of the camera 60 may be based on the operation timing of the camera 60 (for example, the timing of termination of data transfer). For example, the camera 60 may be controlled to repeat a series of operations that opens the shutter 64, closes the shutter 64 at a timing of elapse of a predetermined time period after exposure of all the pixels of the image sensor 62 since the timing of opening the shutter 64, starts data transfer at the timing of closing the shutter 64 and opens the shutter 64 again at a timing of termination of the data transfer. This modification may be configured to generate a laser irradiation pulse, which rises at the time of exposure of all the pixels of the image sensor 62 based on one of these timings of the camera 60 and falls after elapse of a predetermined time period and to generate a scanner driving pulse such that the angle of the Galvano scanner 350 becomes equal to 45 degrees at the center of the laser irradiation pulse. Another modification may be configured without the speed detector 380 to generate a laser irradiation pulse, a shutter opening pulse and a scanner driving pulse for driving the Galvano scanner 350 at an appropriate timing, to cause the driver 351 to drive the Galvano scanner 350 based on the generated scanner driving pulse, to perform laser radiation based on the laser irradiation pulse, and to open and close the shutter 64 of the camera 60 based on the shutter 64 opening pulse. For example, this modification may be configured to generate a reference pulse at a timing of the flow by the distance of the imaging range 24 based on the flow rate of the flow cell 22, to generate a shutter opening pulse that opens the shutter 64 of the camera 60 based on the reference pulse, closes the shutter 64 at a timing of elapse of a predetermined time period after exposure of all the pixels of the image sensor 42 since the timing of opening the shutter 64, and starts data transfer at the timing of closing the shutter 64, to generate a laser irradiation pulse, which rises at the timing of exposure of all the pixels of the image sensor 62 and then falls after elapse of a predetermined time period, and to generate a scanner driving pulse such that the angle of the Galvano scanner 350 becomes equal to 45 degrees at the center of the laser irradiation pulse.

In the flow cytometers 20, 220, 320 and 420 of the respective embodiments and modifications described above, only the adjustment lens 56 is placed after the imaging optical system 44, 244 or 344 to introduce the signal light into the camera 60. Like a modification shown in FIG. 18, a multicolor mirror device 580 may be placed between the adjustment lens 54 of the imaging optical system 44, 244 or 344 and the adjustment lens 56. The multicolor mirror device 580 is placed between the adjustment lens 54 and the adjustment lens 56 such that the signal light from the adjustment lens 54 is reflected and enters the adjustment lens 56. The multicolor mirror device 580 includes an ordinary mirror 582 and a dichroic mirror 584 that is placed at a slightly different angle from the installation angle of the mirror 582 and that is configured to reflect light of green color wavelength but transmit lights of other wavelengths. Accordingly, an image reflected by the mirror 582 and an image reflected by the dichroic mirror 584 are exposed in the image sensor 62 with a shift corresponding to the difference between the installation angles of the mirror 582 and the dichroic mirror 584. This modification may use a maker that displays a color other than green color and a marker that display green color for an imaging object flowing in the flow cell 22 and may adjust the angle of the dichroic mirror 584 to be shifted in a direction perpendicular to the flow direction in the flow cell 22 on the image sensor 62 by a distance slightly longer than a length of the imaging object flowing in the flow cell 22 in the direction perpendicular to the flow direction. This configuration causes an image with the marker that displays the color other than green color to be exposed at an ordinary position in the image sensor 62 and an image with the marker that displays green color to be exposed at a position shifted from the ordinary position in the direction perpendicular to the flow direction in the flow cell 22. Another configuration of adjusting the angle of the dichroic mirror 584 to be shifted in the flow direction in the flow cell 22 on the image sensor 62 by a distance slightly longer than a length of the imaging object flowing in the flow cell 22 in the flow direction of the imaging object causes an image with the marker that displays the color other than green color to be exposed at an ordinary position in the image sensor 62 and an image with the marker that displays green color to be exposed at a position shifted from the ordinary position in the direction perpendicular to the flow direction in the flow cell 22. As a result, these configurations provide two images without decreasing the frame rate. The multicolor mirror device 580 may not be limited to the configuration including one mirror 582 and one dichroic mirror 584 but may be configured to include one mirror and a plurality of dichroic mirrors or may be configured to include only a plurality of dichroic mirrors with omission of the ordinary mirror. In these configurations, the plurality of dichroic mirrors used may serve to reflect lights of respectively different wavelengths and may be placed at respectively different angles. This causes images corresponding to the number of the dichroic mirrors to be exposed at respectively different positions on the image sensor 62.

Figure 18:
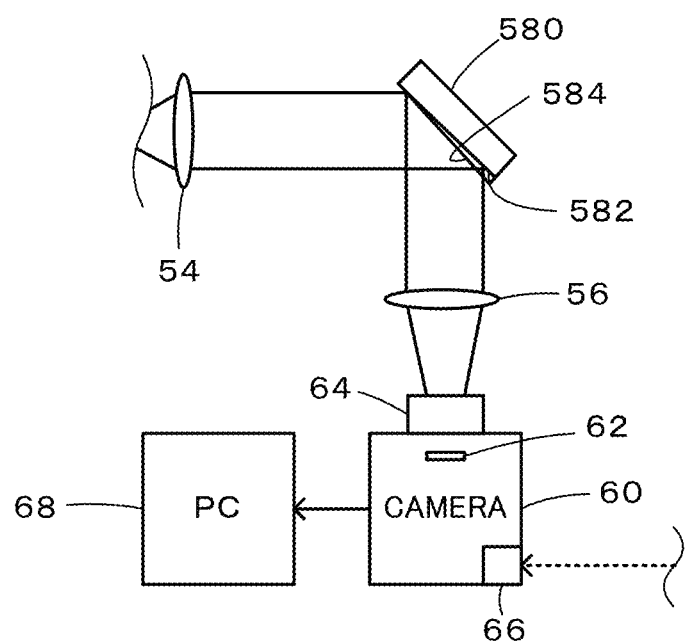
FIG. 18 is a configuration diagram illustrating one example of an optical system in a flow cytometer according to a modification.
Figure 19:
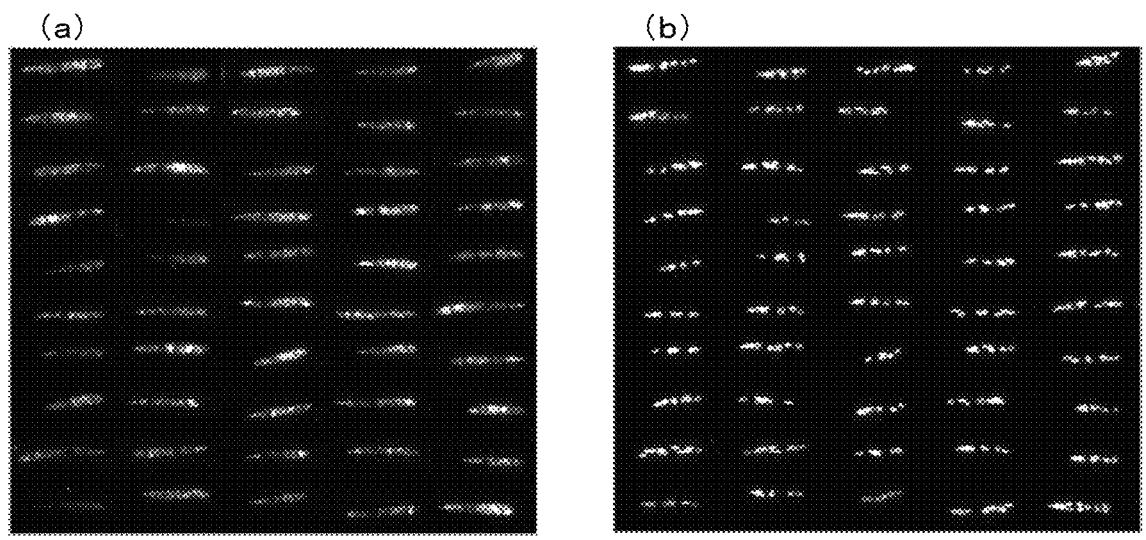
FIG. 19 shows two images (BODIPY fluorescence image and chlorophyll autofluorescence image) obtained by imaging *Euglena gracilis* flowing in a flow cell 22 using a multicolor mirror device 580.

FIG. 19 shows two images (BODIPY fluorescence image and chlorophyll autofluorescence image) obtained by imaging *Euglena gracilis* flowing in the flow cell 22 in the configuration that the multicolor mirror device 580 is placed between the adjustment lens 54 of the imaging optical system 44, 244 or 344 and the adjustment lens 56 as shown in the modification of FIG. 18. FIG. 19(*a*) on the left side is the BODIPY fluorescence image, and FIG. 19(*b*) on the right side is the chlorophyll autofluorescence image. Images on an identical row and an identical column in the BODIPY fluorescence image and in the chlorophyll autofluorescence image indicate an identical individual of *Euglena gracilis*. When an image in an n-th row and m-th column is expressed as an image of (n, m), individuals of *Euglena gracilis* flow in the flow cell 22 in a sequence of (1, 1), (1, 2), . . . , (1,5), (2,1), (2,2), . . . , (2,5), (3.1), . . . . Two clear images (BODIPY fluorescence image and chlorophyll autofluorescence image) are obtained in this manner by using the multicolor mirror device 580.

Figure 20:
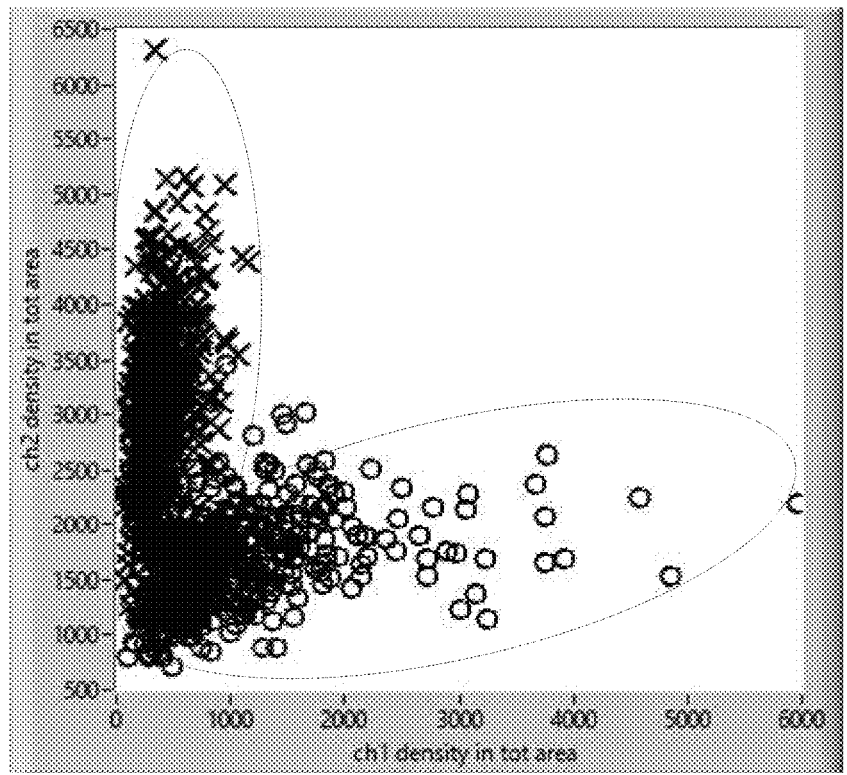
FIG. 20 is a graph showing distributions of intracellular density of BODIPY fluorescence and intracellular density of chlorophyll autofluorescence with regard to normal *Euglena gracilis* and nitrogen-deficient *Euglena gracilis*.

FIG. 20 is a graph showing distributions of intracellular density of BODIPY fluorescence and intracellular density of chlorophyll autofluorescence with regard to normal *Euglena gracilis* and nitrogen-deficient *Euglena gracilis*. Cross marks encircled by a broken-line vertically long ellipse indicate the normal *Euglena gracilis*, and circles encircled by a broken-line horizontally long ellipse indicate the nitrogen-deficient *Euglena gracilis*. As shown by the graph, the normal *Euglena gracilis* and the nitrogen-deficient *Euglena gracilis* have different distributions of the intracellular density of BODIPY fluorescence and the intracellular density of chlorophyll autofluorescence. Accordingly, a procedure of imaging an unknown individual of *Euglena gracilis* and measuring the intracellular density of BODIPY fluorescence and the intracellular density of chlorophyll autofluorescence allows for discrimination between the normal *Euglena gracilis* and the nitrogen-deficient *Euglena gracilis*.

Embodiment 4

Figure 21:
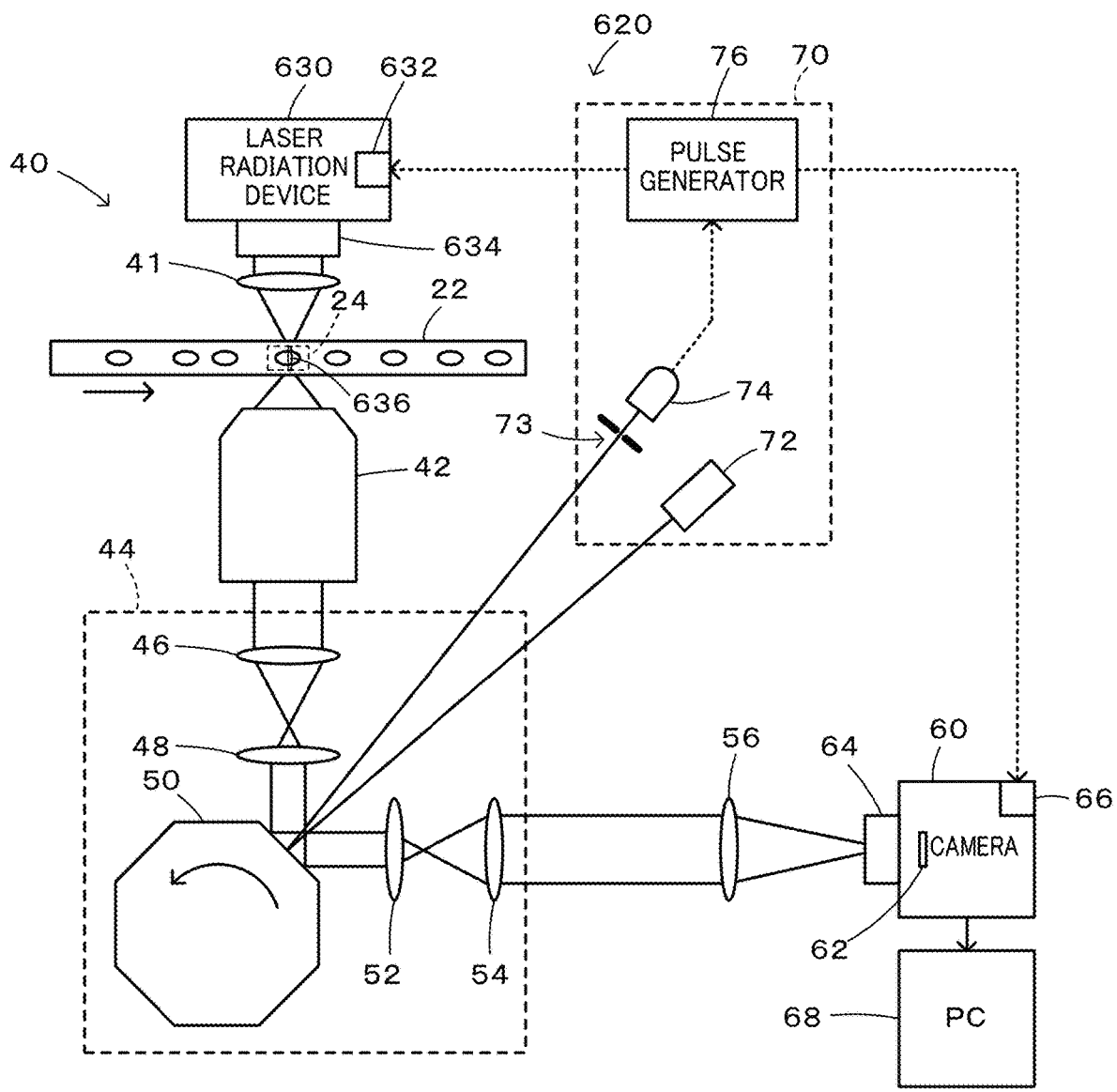
FIG. 21 is a configuration diagram illustrating the schematic configuration of a flow cytometer 620 according to a fourth embodiment of the present disclosure.

FIG. 21 is a configuration diagram illustrating the schematic configuration of a flow cytometer 620 according to a fourth embodiment of the present disclosure. As understood from comparison between FIG. 1 and FIG. 21, the flow cytometer 620 of the fourth embodiment has a similar configuration to that of the flow cytometer 20 of the first embodiment, except that a laser radiation device 630 includes a beam scanner 634. In order to avoid duplicated explanation, like components of the flow cytometer 620 of the fourth embodiment to the components of the flow cytometer 20 of the first embodiment are expressed by like reference signs, and their detailed description is omitted.

Figure 22:
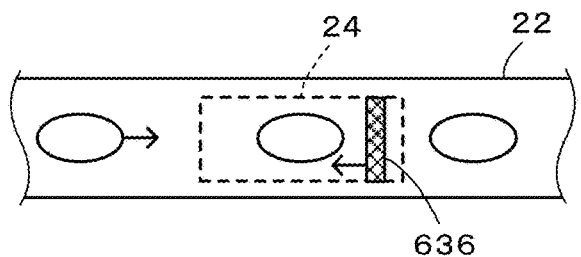
FIG. 22 is a diagram illustrating scanning in an imaging range 24 by concentrated laser beam 636.

The laser radiation device 630 in the flow cytometer 620 of the fourth embodiment includes the beam scanner 634 configured to focus laser beams and radiate focused laser beam 636 in a scanning manner; and a driver 632 configured to perform laser radiation and drive the beam scanner 634. The driver 632 is activated by input of a pulse signal to start radiation of laser beam at a rise of the pulse signal and controls the beam scanner 634 to scan the imaging range 24 with the focused laser beam 636 via the radiation lens 41 in an opposite direction to the flow in the flow cell 22 as shown in FIG. 22. The focused laser beam 636 provides a sufficient image luminance in a short exposure time and accordingly provides a clearer image even in the case of incomplete descanning. The similar advantageous effect may be achieved by a configuration that locally irradiates the imaging range 24 with the focused laser beam 636 and that scans part of or the entire imaging range 24 by the beam scanner 634 during the exposure time of the camera. Scanning the imaging range 24 with the focused laser beam 636 in the opposite direction to the flow in the flow cell 22 causes light such as fluorescent light that contributes to imaging to pass through positions close to the centers of the imaging lens 46 and the adjustment lens 48 and the adjustment lens 52. This configuration reduces the effect of distortion aberration caused by these lenses in the vicinity of the imaging range (field of view of the camera) and provides the longer descanning time.

The flow cytometer 620 of the fourth embodiment described above scans the imaging range 24 with the focused laser beam 636 formed by focusing laser beams in the opposite direction to the flow in the flow cell 22. This configuration enables the clearly image to be obtained even in the case of incomplete descanning. This configuration also reduces the effect of distortion aberration occurring in the vicinity of the imaging range (field of view of the camera) and provides the longer descanning time.

The flow cytometer 620 of the fourth embodiment is provided with the polygon scanner 50 and the laser beam irradiator 72 and the laser beam detector 74 for detection of the position of the opposed mirror of the polygon scanner 50, like the flow cytometer 20 of the first embodiment. Like the flow cytometer 220 of the second embodiment shown in FIG. 11, the flow cytometer 620 of the fourth embodiment may be configured without the laser beam irradiator 72 and the laser beam detector 74 and may be provided with the resonant galvanometric scanner 250 and its driver 251 in place of the polygon scanner 50 and with the pulse generator 276 configured to generate a pulse based on a reference signal from the driver 251 of the resonant galvanometric scanner 250 in place of the pulse generator 76 configured to generate a pulse based on the signal from the laser beam detector 74. Like the flow cytometer 320 of the third embodiment shown in FIG. 13, the flow cell 22 may be provided with the speed detector 380 for detecting the speed of an imaging object and the waveform generator 390, and the flow cytometer 620 of the fourth embodiment may be provided with the pulse generator 376 configured to generate a pulse based on a reference signal from the waveform generator 390 in place of the pulse generator 76 configured to generate a pulse based on the signal from the laser beam detector 74.

In the flow cytometer 620 of the fourth embodiment, the camera 60 may be set in the rolling shutter mode. The camera 60 may also be set in the global shutter mode or in the global reset mode.

In the flow cytometers 20, 220, 320 and 620 of the first to the fourth embodiments and their modifications, the flow cell 22 is basically irradiated with the laser beam from the laser radiation device 30 via the radiation lens 41, and the signal light (light such as transmitted light, reflected light, scattered light, or fluorescent light) is input into the objective lens 42 that is placed in the flow cell 22 on the opposite side to the radiation lens 41. A modification may be provided with a half mirror between the objective lens 42 and the imaging optical system 44, and the flow cell 22 may be irradiated with laser beam from the laser radiation device 30 via the half mirror and the objective lens 42 or may be irradiated with leaser beam from the laser radiation device 30 from a lateral side of the objective lens 42.

Embodiment 5

Figure 23:
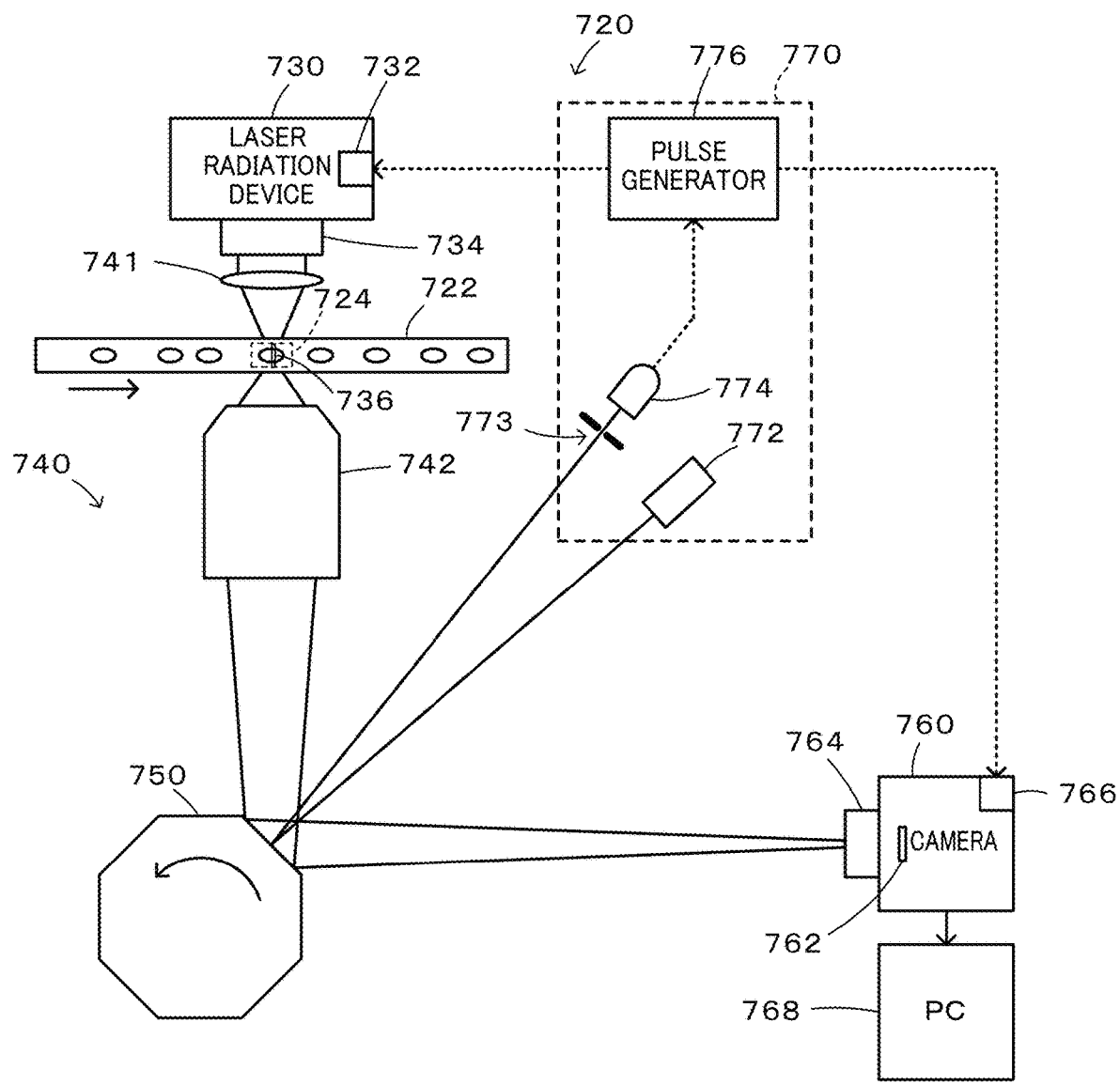
FIG. 23 is a configuration diagram illustrating the schematic configuration of a flow cytometer 720 according to a fifth embodiment of the present disclosure.

FIG. 23 is a configuration diagram illustrating the schematic configuration of a flow cytometer 720 according to a fifth embodiment of the present disclosure. The flow cytometer 720 of the fifth embodiment includes a flow cell 722 in which an imaging object flows uniformly in a direction of an arrow shown in FIG. 23; a laser radiation device 730 configured to emit laser beam; a camera 760; an optical system 740 configured to introduce the laser beam emitted from the laser radiation device 730 to an imaging range 724 of the flow cell 722 and to introduce signal light from the imaging range 724 of the flow cell 722 to the camera 760: and a timing adjustment device 770 configured to adjust an imaging timing. The camera 760, a PC 768 and the timing adjustment device 770 provided in the flow cytometer 720 of the fifth embodiment have similar configurations to those of the camera 60, the PC 68 and the timing adjustment device 70 provided in the flow cytometer 20 of the first embodiment. Accordingly, in order to avoid duplicated explanation, the detailed description of the camera 760, the PC 768 and the timing adjustment device 770 is omitted.

The laser radiation device 730 is configured as a known laser radiation device to emit parallel laser beams and includes a beam scanner 734 configured to focus laser beams and radiate focused laser beam 736 in a scanning manner; and a driver 732 configured to perform laser radiation and drive the beam scanner 734.

The optical system 740 includes a radiation lens 741 configured to introduce the focused laser beam 736 that is emitted from the laser radiation device 730 and that is focused to scan by the beam scanner 734, to the imaging range 724 of the flow cell 722; an objective lens 742 configured to receive signal light (light such as transmitted light, reflected light, scattered light, or fluorescent light) input from the imaging range 724 of the flow cell 722; and a polygon scanner 750 configured to reflect signal light from the objective lens 742. Like the polygon scanner 50 of the first embodiment, the polygon scanner 750 is formed as a regular polygonal prism to have mirrors formed on respective side faces and is rotated about a center axis of the regular polygonal prism as a rotating shaft.

Like the first embodiment, according to the fifth embodiment, the laser radiation device 730, the polygon scanner 750 and the camera 760 are arranged such that when the angle of the polygon scanner 750 relative to the objective lens 742 is 45 degrees, the focused laser beam 736 that is emitted from the laser radiation device 730 to the center of the imaging range 724 via the beam scanner 734, is reflected by an opposed mirror of the polygon scanner 750 and enters a center pixel of an image sensor 762 of the camera 760. Additionally, like the first embodiment, according to the fifth embodiment, the rotation speed of the polygon scanner 750 and the flow rate of the flow cell 722 are adjusted such that a center image of the imaging range 724 in the flow cell 722 is input into a center pixel (identical pixel) of the image sensor 762 of the camera 760 for a predetermined time period (time period of, for example, 10 μsec or 20 μsec) around a timing when the angle of the opposed mirror of the polygon scanner 750 is 45 degrees. Furthermore, like the first embodiment, according to the fifth embodiment, the flow rate of the flow cell 722 and the number of angles in the regular polygonal prism of the polygon scanner 750 are adjusted such that a required time period from a time when the angle of an opposed mirror of the polygon scanner 750 reaches 45 degrees to a time when the angle of a subsequent opposed mirror becomes equal to 45 degrees by rotation of the polygon scanner 750 becomes equal to or shorter than a time period required for the flow of an imaging object by the distance of the imaging range 724 by the flow in the flow cell 722.

The driver 732 of the laser radiation device 730 is activated by input of a pulse signal from the timing adjustment device 770 to start radiation of laser beam at a rise of the pulse signal and controls the beam scanner 734 to scan the imaging range 724 with the focused laser beam 736 via the radiation lens 741 in an opposite direction to the flow in the flow cell 724 as shown in FIG. 22. The focused laser beam 736 provides a sufficient image luminance in a short exposure time and accordingly provides a clearer image even in the case of incomplete descanning. Scanning the imaging range 722 with the focused laser beam 736 in the opposite direction to the flow in the flow cell 722 reduces the effect of distortion aberration occurring in the vicinity of the imaging range (field of view of the camera) and provides the longer descanning time.

The flow cytometer 720 of the fifth embodiment performs detection of laser beam by a laser beam detector 774, output of a laser irradiation pulse by a pulse generator 776, laser radiation by the laser radiation device 730, output of a shutter opening pulse by the pulse generator 776, opening/closing of a shutter 764 of the camera 760, transfer of data of the image sensor 762 of the camera 760 to the PC 768 and the like by only scanning the imaging range 724 with the focused laser beam 736 in an opposite direction to the flow in the flow cells 722 during the time of laser radiation.

In the flow cytometer 720 of the fifth embodiment described above, the shutter 764 of the camera 760 is opened at a timing of detection of laser beam by the laser beam detector 774. In the state that all the pixels of the image sensor 762 are exposed, the imaging range 724 is scanned with the focused laser beam emitted from the laser radiation device 730 via the beam scanner 734 in the opposite direction to the flow in the flow cell 722 for a predetermined time period (time period of approximately 10 μsec or 20 μsec). In this state, the rotation speed of the polygon scanner 750 and the flow rate of the flow cell 722 are adjusted such that an image (signal light) of each part of an imaging object flowing in the imaging range 724 of the flow cell 722 is input into an identical pixel of the image sensor 762 of the camera 760 for a predetermined time period (time period of approximately 10 μsec or 20 μsec) around a timing when the opposed mirror of the polygon scanner 750 is at 45 degrees. Accordingly, even the exposure for the predetermined time period suppress image blurring due to movement of the imaging object and provides a clearer image, compared with exposure for a very short time period. The focused laser beam 736 provides a sufficient image luminance in a short exposure time and accordingly provides a clearer image even in the case of incomplete descanning. Additionally, scanning the imaging range 724 with the focused laser beam 736 in the opposite direction to the flow in the flow cell 724 reduces the effect of distortion aberration occurring in the vicinity of the imaging range (field of view of the camera) and provides the longer descanning time. The flow rate of the flow cell 722 and the number of angles in the regular polygonal prism of the polygon scanner 750 are adjusted such that the required time period from the time when the angle of an opposed mirror of the polygon scanner 750 reaches 45 degrees to the time when the angle of a subsequent opposed mirror becomes equal to 45 degrees by rotation of the polygon scanner 750 becomes equal to or shorter than the time period required for the flow of the imaging object by the distance of the imaging range 724 by the flow in the flow cell 722. This configuration enables the imaging object flowing in the flow cell 722 to be imaged thoroughly. As a result, this configuration increases the flow rate in the flow cell 722 and enables a larger number of imaging objects to be imaged more clearly for a short time period.

Like the flow cytometer 220 of the second embodiment shown in FIG. 11, the flow cytometer 720 of the fifth embodiment may be configured without the laser beam irradiator 772 and the laser beam detector 774 and may be provided with the resonant galvanometric scanner 250 and its driver 251 in place of the polygon scanner 750 and with the pulse generator 276 configured to generate a pulse based on a reference signal from the driver 251 of the resonant galvanometric scanner 250 in place of the pulse generator 776 configured to generate a pulse based on the signal from the laser beam detector 774. Like the flow cytometer 320 of the third embodiment shown in FIG. 13, the flow cell 722 may be provided with the speed detector 380 for detecting the speed of an imaging object and the waveform generator 390, and the flow cytometer 720 of the fifth embodiment may be provided with the pulse generator 376 configured to generate a pulse based on a reference signal from the waveform generator 390 in place of the pulse generator 776 configured to generate a pulse based on the signal from the laser beam detector 774.

In the flow cytometer 720 of the fifth embodiment, the camera 760 may be set in the rolling shutter mode. The camera 760 may also be set in the global shutter mode or in the global reset mode.

The flow cytometer 720 of the fifth embodiment is basically a flow cytometer including a flow cell in which an imaging object flows; a laser beam irradiator configured to radiate laser beam; a camera including an image sensor of N×M pixels; and an optical system configured to introduce the laser beam from the laser beam irradiator to an imaging range of the flow cell and to introduce signal light, such as transmitted light, reflected light or scattered light, from the imaging range of the flow cell, to the camera. The optical system includes a mirror device that has at least one mirror specularly reflecting the signal light and that is driven and rotated in conjunction with a flow in the flow cell, such that each part of an image formed by the signal light is introduced into an identical pixel of the image sensor for at least a predetermined time period from a predetermined timing. The laser beam irradiator is configured to scan the imaging range with focused laser beam that is formed by focusing the laser beam. Furthermore, the flow cytometer 720 is a flow cytometer additionally including a predetermined timing setting device configured to set the predetermined timing; a camera control device configured to control the camera, such as to open a shutter for a time period that is equal to or longer than the predetermined time period in connection with the predetermined timing set by the predetermined timing setting device and subsequently transfer data of the image sensor to a storage device; and a laser beam irradiation control device configured to control the laser beam irradiator, such as to scan the imaging range with the focused laser beam in an opposite direction to the flow in the flow cell during opening of the shutter of the camera.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the flow cytometer and so on.

The invention claimed is:

1. A flow cytometer comprising:
a flow cell in which an imaging object flows;
a laser beam irradiator configured to radiate a laser beam;
a camera including an image sensor of N×M pixels;
an optical system configured to introduce the laser beam from the laser beam irradiator to an imaging range of the flow cell and to introduce signal light from the imaging range of the flow cell to the camera, the optical system including:
a mirror device that is provided on a Fourier plane of an imaging optical system, that has at least one mirror specularly reflecting the signal light, and that is driven and rotated in conjunction with a flow in the flow cell, such that each part of an image formed by the signal light is introduced into an identical pixel of the image sensor for at least a predetermined time period from a predetermined timing;
a predetermined timing setting device configured to set the predetermined timing;
a camera control device configured to control the camera to open a shutter for a time period that is equal to or longer than the predetermined time period in connection with the predetermined timing set by the predetermined timing setting device and subsequently transfer data of the image sensor to a storage device; and
a laser beam irradiation control device configured to control the laser beam irradiator to radiate the laser beam for the predetermined time period in connection with the predetermined timing set by the predetermined timing setting device.

2. The flow cytometer according to claim 1, wherein the predetermined timing setting device sets the predetermined timing according to at least one of:

a first setting technique of setting the predetermined timing based on a rotational position of the mirror of the mirror device,
a second setting technique of setting the predetermined timing based on an operating state of the camera, and/or
a third setting technique of setting the predetermined timing based on a predetermined cycle.

3. The flow cytometer according to claim 1, wherein
the camera is operated in a rolling shutter mode, and
the laser beam irradiator includes a laser beam adjuster configured to radiate one or two laser beams in a scanning manner from a position on the flow cell where an image is obtained with regard to a line having an earlier timing of exposure of the camera toward a position on the flow cell where an image is obtained with regard to a line having a later timing of exposure.

4. The flow cytometer according to claim 1, wherein
the camera is operated in a rolling shutter mode,
the flow cytometer further comprising:
an image processing device configured to form an image of the imaging object by image processing based on data of consecutive frames of the camera stored in the storage device and a radiation timing of the laser beam from the laser beam irradiator.

5. A flow cytometer comprising:
a flow cell in which an imaging object flows;
a laser beam irradiator configured to radiate a laser beam;
a camera including an image sensor of N×M pixels; and
an optical system configured to introduce the laser beam from the laser beam irradiator to an imaging range of the flow cell and to introduce signal light from the imaging range of the flow cell to the camera, the optical system including:
a mirror device that is provided on a Fourier plane of an imaging optical system, that has at least one mirror specularly reflecting the signal light, and that is driven and rotated in conjunction with a flow in the flow cell, such that each part of an image formed by the signal light is introduced into an identical pixel of the image sensor for at least a predetermined time period from a predetermined timing, wherein:
the mirror device has mirrors that are formed on respective side faces of a regular polygonal prism and is rotated about a center axis of the regular polygonal prism as a rotating axis, and
a number of angles in the regular polygonal prism of the mirror device is adjusted according to a flow rate of the flow cell, such that a required time period from a time when an angle of one side face is a predetermined angle to a time when an angle of a next side face becomes equal to the predetermined angle by rotation becomes equal to or shorter than a time period required for flow of the imaging object by a distance of the imaging range by the flow in the flow cell.

6. A flow cytometer comprising:
a flow cell in which an imaging object flows;
a laser beam irradiator configured to radiate a laser beam;
a camera including an image sensor of N×M pixels;
an optical system configured to introduce the laser beam from the laser beam irradiator to an imaging range of the flow cell and to introduce signal light from the imaging range of the flow cell to the camera, the optical system including:
a mirror device that is a resonant galvanometric scanner that vibrates in a rotating direction at a predetermined cycle, the mirror device: (i) being provided on a Fourier plane of an imaging optical system, (ii) including at least one mirror specularly reflecting the signal light, and (iii) being driven and rotated in conjunction with a flow in the flow cell, such that each part of an image formed by the signal light is introduced into an identical pixel of the image sensor for at least a predetermined time period from a predetermined timing;
a camera control device configured to control the camera to open a shutter for a time period equal to or longer than the predetermined time period, based on a periodical timing according to the cycle of vibration of the mirror device and subsequently transfer data of the image sensor to a storage device; and
a laser beam irradiation control device configured to control the laser beam irradiator to radiate the laser beam for the predetermined time period, based on the periodical timing.

7. A flow cytometer comprising:
a flow cell in which an imaging object flows;
a laser beam irradiator configured to radiate a laser beam;
a camera including an image sensor of N×M pixels;
an optical system configured to introduce the laser beam from the laser beam irradiator to an imaging range of the flow cell and to introduce signal light from the imaging range of the flow cell to the camera, the optical system including:
a mirror device that is provided on a Fourier plane of an imaging optical system, that has at least one mirror specularly reflecting the signal light, and that is driven and rotated in conjunction with a flow in the flow cell, such that each part of an image formed by the signal light is introduced into an identical pixel of the image sensor for at least a predetermined time period from a predetermined timing;
a speed timing measurement device placed on an upstream side of the imaging range in the flow cell and configured to measure a flow rate of an imaging object flowing in the flow cell and to measure an arrival timing when center of the imaging object subjected to measurement of the flow rate reaches center of the imaging range;
a mirror device control device configured to cause a center image of the imaging range to be input into a center pixel of the image sensor at the arrival timing and to drive and rotate the mirror device at a rotation speed based on the flow rate of the imaging object;
a camera control device configured to control the camera to open a shutter from a timing prior to the arrival timing by a time period that is longer than half the predetermined time period to a timing subsequent to the arrival timing by a time period that is longer than half the predetermined time period and subsequently transfer data of the image sensor to a storage device; and
a laser beam irradiation control device configured to control the laser beam irradiator to radiate the laser beam for the predetermined time period such that the arrival timing is middle of a radiation time of the laser beam.

8. A flow cytometer comprising:
a flow cell in which an imaging object flows;
a laser beam irradiator configured to radiate a laser beam;
a camera including an image sensor of N×M pixels;
an optical system configured to introduce the laser beam from the laser beam irradiator to an imaging range of the flow cell and to introduce signal light from the imaging range of the flow cell to the camera, the optical system including:

a mirror device that is provided on a Fourier plane of an imaging optical system, that has at least one mirror specularly reflecting the signal light, and that is driven and rotated in conjunction with a flow in the flow cell, such that each part of an image formed by the signal light is introduced into an identical pixel of the image sensor for at least a predetermined time period from a predetermined timing;

a predetermined timing setting device configured to set the predetermined timing;

a camera control device configured to control the camera to open a shutter for a time period that is equal to or longer than the predetermined time period in connection with the predetermined timing set by the predetermined timing setting device and subsequently transfer data of the image sensor to a storage device; and a laser beam irradiation control device configured to control the laser beam irradiator to scan the imaging range with a focused laser beam during opening of the shutter of the camera.

9. The flow cytometer according to claim 8, wherein the laser beam irradiation control device controls the laser beam irradiator to scan the imaging range with the focused laser beam in an opposite direction to the flow in the flow cell.

10. The flow cytometer according to claim 1, wherein the optical system comprises a multicolor mirror device that includes one mirror and at least one dichroic mirror having a different angle from an angle of the mirror or includes at least two dichroic mirrors having different angles and that is configured to reflect the signal light from the mirror device and introduce the reflected signal light to the camera.

11. The flow cytometer according to claim 10, wherein an angle of the multicolor mirror device is adjusted such that an image reflected by the dichroic mirror and exposed on the image sensor is exposed at a position different in a flow direction or at a different position in a direction perpendicular to the flow direction from an exposed position of another image reflected by the mirror or another dichroic mirror and exposed on the image sensor.

* * * * *